(12) United States Patent
Liu et al.

(10) Patent No.: US 10,547,494 B2
(45) Date of Patent: Jan. 28, 2020

(54) UNLICENSED SPECTRUM COVERAGE ENHANCEMENT FOR INDUSTRIAL INTERNET OF THINGS

(71) Applicant: QUALCOMM Incorporated, San Diego, CA (US)

(72) Inventors: Chih-Hao Liu, San Diego, CA (US); Chirag Patel, San Diego, CA (US); Srinivas Yerramalli, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 15/697,212

(22) Filed: Sep. 6, 2017

(65) Prior Publication Data
US 2018/0123859 A1 May 3, 2018

Related U.S. Application Data

(60) Provisional application No. 62/415,316, filed on Oct. 31, 2016.

(51) Int. Cl.
*H04L 29/08* (2006.01)
(52) U.S. Cl.
CPC .... *H04L 29/0854* (2013.01); *H04L 29/08423* (2013.01); *H04L 29/08018* (2013.01); *H04L 29/08027* (2013.01)
(58) Field of Classification Search
CPC combination set(s) only.
See application file for complete search history.

(56) References Cited

U.S. PATENT DOCUMENTS

2010/0246427 A1* 9/2010 Gheorghiu .............. H04L 1/007
370/252
2010/0246518 A1* 9/2010 Gheorghiu ............ H04L 1/0028
370/329

(Continued)

FOREIGN PATENT DOCUMENTS

WO WO-2016122384 A1 8/2016

OTHER PUBLICATIONS

ISA/EP, International Search Report and Written Opinion of the International Searching Authority, Int'l Application No. PCT/US2017/050424, dated Nov. 17, 2017, European Patent Office, Rijswijk, NL, 15 pgs.

*Primary Examiner* — Yee F Lam
(74) *Attorney, Agent, or Firm* — Holland & Hart LLP/Qualcomm

(57) ABSTRACT

This disclosure includes methods, systems, and devices for wireless communication. A repetition of symbols may be used to increase a device's ability to synchronize and communicate using unlicensed spectrum. For example, a base station may schedule a frame that includes repetitions, in time or frequency, of a control or data signal. After performing a listen-before-talk (LBT) procedure, the base station may broadcast or transmit the frame to one or more devices, such as a user equipment (UE). For instance, the frame may include repetitions of a discovery reference signal (DRS), and be broadcast by the base station to enable synchronization by the UE. In other examples, the signal may include repetitions of a cell-specific reference signal (CRS), and a UE may identify a start of a transmission opportunity using the CRSs. Other signals, such as downlink control and shared channels, may be repeated within a frame in a similar manner.

26 Claims, 20 Drawing Sheets

(56) References Cited

U.S. PATENT DOCUMENTS

| | | | |
|---|---|---|---|
| 2015/0078300 A1 | 3/2015 | Xu et al. | |
| 2015/0223245 A1 | 8/2015 | Cheng et al. | |
| 2015/0264638 A1 | 9/2015 | Han et al. | |
| 2015/0365880 A1* | 12/2015 | Malladi | H04L 5/0007 370/312 |
| 2016/0007353 A1* | 1/2016 | Malladi | H04L 5/0053 370/329 |
| 2016/0192396 A1* | 6/2016 | Ng | H04W 74/0808 370/329 |
| 2016/0316374 A1* | 10/2016 | Xu | H04W 16/14 |
| 2017/0289899 A1* | 10/2017 | You | H04W 48/12 |
| 2018/0013529 A1* | 1/2018 | You | H04L 5/00 |
| 2018/0014283 A1* | 1/2018 | You | H04L 5/0094 |
| 2018/0242350 A1* | 8/2018 | Takeda | H04W 72/1289 |
| 2018/0287761 A1* | 10/2018 | You | H04L 5/00 |

\* cited by examiner

CRS AP 0/1 420

CRS Repetition AP 0/1 425

CRS AP 2/3 430

UNLICENSED SPECTRUM COVERAGE ENHANCEMENT FOR INDUSTRIAL INTERNET OF THINGS

CROSS REFERENCES

The present application for patent claims priority to U.S. Provisional Patent Application No. 62/415,316 by Liu, et al., entitled "Unlicensed Spectrum Coverage Enhancement for Industrial Internet of Things," filed Oct. 31, 2016, assigned to the assignee hereof, and is hereby expressly incorporated by reference herein in its entirety.

TECHNICAL FIELD

This disclosure relates to wireless communication systems, and more specifically to unlicensed spectrum coverage enhancement for industrial internet of things (IoT).

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (such as a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communications systems may be used to support techniques that provide various devices and common objects with connectivity for communicating data, often referred to as the IoT. In some examples, these wireless communications systems may operate using a first radio access technology (RAT), such as LTE or LTE-Advanced (LTE-A), and may include a number of base stations, each simultaneously supporting communications with multiple devices, such as IoT devices or UEs. These base stations and UEs operating in accordance with the first RAT also may communicate in a shared or unlicensed radio frequency (RF) spectrum.

The application of the IoT in an industrial setting, such as manufacturing plants, may increase operational efficiency and introduce more flexible production techniques. However, benefits gained from industrial IoT schemes also may be reliant on the use of unlicensed RF spectrum due to costs associated with licensed RF spectrum use. As a result, it may be beneficial to implement coverage and link budget enhancement schemes for wireless communications systems using unlicensed spectrum to ensure connectivity for devices in industrial IoT settings.

SUMMARY

The systems, methods and devices of this disclosure each have several innovative aspects, no single one of which is solely responsible for the desirable attributes disclosed herein.

A method of wireless communication at a device using unlicensed spectrum is described. The method may include receiving a first frame including a first signal and at least one repetition of the first signal in time or in frequency, the first signal including a data signal or a control signal, and communicating with a base station based at least in part on the received first frame.

An apparatus for wireless communication at a device using unlicensed spectrum is described. The apparatus may include a processor, memory in electronic communication with the processor, and instructions stored in the memory. The instructions may be operable to cause the processor to receive a first frame including a first signal and at least one repetition of the first signal in time or in frequency, the first signal including a data signal or a control signal, and communicate with a base station based at least in part on the received first frame.

Another apparatus for wireless communication at a device using unlicensed spectrum is described. The apparatus may include means for receiving a first frame including a first signal and at least one repetition of the first signal in time or in frequency, the first signal including a data signal or a control signal, and means for communicating with a base station based at least in part on the received first frame.

A non-transitory computer readable medium for wireless communication at a device using unlicensed spectrum is described. The non-transitory computer-readable medium may include instructions operable to cause a processor to receive a first frame including a first signal and at least one repetition of the first signal in time or in frequency, the first signal including a data signal or a control signal, and communicate with a base station based at least in part on the received first frame.

In some examples of the method, apparatus, and non-transitory computer-readable medium described above, the first signal includes a discovery reference signal (DRS) within a temporally first subframe of the received first frame, the at least one repetition of the first signal including a repetition of the DRS within one or more subsequent subframes of the received first frame. Some examples of the method, apparatus, and non-transitory computer-readable medium described above may further include processes, features, means, or instructions for determining a timing synchronization, a system bandwidth, and system information block (SIB) information associated with the base station based at least in part on the DRS and the repetition of the DRS. In some examples of the method, apparatus, and non-transitory computer-readable medium described above, the first signal includes a synchronization signal within a DRS subframe of the received first frame, and the at least one repetition of the first signal includes a repetition of the synchronization signal within the DRS subframe.

In some examples of the method, apparatus, and non-transitory computer-readable medium described above, the first signal includes an enhanced machine type communication (MTC) physical downlink control channel (eMPDCCH) within a temporally second subframe of the received first frame. Some examples of the method, apparatus, and non-transitory computer-readable medium described above may further include processes, features, means, or instructions for identifying a set of system information blocks (SIBs) within a subsequent subframe of the received first frame based at least in part on the eMPDCCH.

In some examples of the method, apparatus, and non-transitory computer-readable medium described above, the first signal includes a set of cell-specific reference signals (CRSs) within a temporally first subframe of the received first frame, where the at least one repetition of the first signal includes a repetition of the CRSs over a set of subsequent subframes. Some examples of the method, apparatus, and non-transitory computer-readable medium described above may further include processes, features, means, or instructions for detecting a start of a transmission opportunity based at least on a combination of the set of CRSs in the temporally first subframe.

In some examples of the method, apparatus, and non-transitory computer-readable medium described above, the first signal includes a set of CRSs within a subframe of the received first frame, where the at least one repetition of the first signal includes a repetition of the set of CRSs within a set of symbols within the subframe. Some examples of the method, apparatus, and non-transitory computer-readable medium described above may further include processes, features, means, or instructions for detecting a start of a transmission opportunity based at least in part on a combination of the CRSs in the subframe.

In some examples of the method, apparatus, and non-transitory computer-readable medium described above, the first signal includes a physical downlink control channel (PDCCH) within a subframe of the received first frame, where the at least one repetition of the first signal includes a repetition of the PDCCH within a same transmission opportunity as the subframe. Some examples of the method, apparatus, and non-transitory computer-readable medium described above may further include processes, features, means, or instructions for identifying a starting point of the PDCCH based at least in part on the subframe. Some examples of the method, apparatus, and non-transitory computer-readable medium described above may further include processes, features, means, or instructions for decoding the first frame based at least in part on the identified starting point of the PDCCH and an accumulation of the PDCCH within the same transmission opportunity of the subframe.

In some examples of the method, apparatus, and non-transitory computer-readable medium described above, the first signal includes a physical downlink control channel (PDCCH) within a temporally first subframe of the received first frame, where the temporally first subframe may be within a first transmission opportunity, and the at least one repetition of the first signal includes a repetition of the PDCCH within a subsequent transmission opportunity. Some examples of the method, apparatus, and non-transitory computer-readable medium described above may further include processes, features, means, or instructions for identifying a starting point of the PDCCH based at least in part on the temporally first subframe. Some examples of the method, apparatus, and non-transitory computer-readable medium described above may further include processes, features, means, or instructions for decoding the first frame based at least in part on the starting point of the PDCCH and an accumulation of the PDCCH within the first transmission opportunity and the subsequent transmission opportunity.

In some examples of the method, apparatus, and non-transitory computer-readable medium described above, the first signal includes an enhanced machine type communication (MTC) physical downlink control channel (eMPDCCH) within a subframe of the received first frame, where the at least one repetition of the first signal includes a frequency domain repetition of the eMPDCCH within a transmission opportunity as the subframe. Some examples of the method, apparatus, and non-transitory computer-readable medium described above may further include processes, features, means, or instructions for identifying a starting point of the eMPDCCH based at least in part on the subframe. Some examples of the method, apparatus, and non-transitory computer-readable medium described above may further include processes, features, means, or instructions for decoding the first frame based at least in part on the starting point of the eMPDCCH and an accumulation of the eMPDCCH within the transmission opportunity of the subframe.

In some examples of the method, apparatus, and non-transitory computer-readable medium described above, the first signal includes a physical downlink shared channel (PDSCH) within a first subframe of the received first frame, where the at least one repetition of the first signal includes a repetition of the PDSCH within additional subframes of a transmission opportunity including the first subframe. Some examples of the method, apparatus, and non-transitory computer-readable medium described above may further include processes, features, means, or instructions for decoding the PDSCH based at least in part on the PDSCH within the first subframe and the repetition of the PDSCH within the additional subframes.

In some examples of the method, apparatus, and non-transitory computer-readable medium described above, the first signal includes a physical downlink shared channel (PDSCH) within a subframe of the received first frame, where the at least one repetition of the first signal includes a time-domain repetition of the PDSCH within a transmission opportunity including the subframe and a subsequent transmission opportunity. In some examples of the method, apparatus, and non-transitory computer-readable medium described above, the communicating includes: transmitting a second frame including a second signal and at least one repetition of the second signal in time, the second signal including a physical uplink shared channel (PUSCH), where the at least one repetition of the second signal may be based at least in part on the received first signal.

In some examples of the method, apparatus, and non-transitory computer-readable medium described above, the communicating includes: transmitting a second frame including a second signal and at least one repetition of the second signal, the second signal including a physical uplink control channel (PUCCH), where the at least one repetition of the second signal may be located within an uplink subframe following a special subframe. Some examples of the method, apparatus, and non-transitory computer-readable medium described above may further include processes, features, means, or instructions for transmitting a second frame including a second signal and at least one repetition of the second signal, the second signal including a physical random access channel (PRACH), where the second signal and the at least one repetition of the second signal may be located within contiguous subframes. In some examples of the method, apparatus, and non-transitory computer-readable medium described above, the first frame includes a semi-statically configured uplink-to-downlink ratio.

A method of wireless communication at a device using unlicensed spectrum is described. The method may include generating a frame including a signal and at least one repetition of the signal in time or in frequency, the signal including a data signal or a control signal, performing a listen before talk (LBT) procedure for one or more channels in the unlicensed spectrum, determining that the one or more channels are clear based at least in part on the performed LBT procedure, and transmitting the frame based at least in part on the determination.

An apparatus for wireless communication at a device using unlicensed spectrum is described. The apparatus may include a processor, memory in electronic communication with the processor, and instructions stored in the memory. The instructions may be operable to cause the processor to generate a frame including a signal and at least one repetition of the signal in time or in frequency, the signal including a data signal or a control signal, perform an LBT procedure for one or more channels in the unlicensed spectrum, determine that the one or more channels are clear based at least in part on the performed LBT procedure, and transmit the frame based at least in part on the determination.

Another apparatus for wireless communication at a device using unlicensed spectrum is described. The apparatus may include means for generating a frame including a signal and at least one repetition of the signal in time or in frequency, the signal including a data signal or a control signal, means for performing an LBT procedure for one or more channels in the unlicensed spectrum, means for determining that the one or more channels are clear based at least in part on the performed LBT procedure, and means for transmitting the frame based at least in part on the determination.

A non-transitory computer readable medium for wireless communication at a device using unlicensed spectrum is described. The non-transitory computer-readable medium may include instructions operable to cause a processor to generate a frame including a signal and at least one repetition of the signal in time or in frequency, the signal including a data signal or a control signal, perform an LBT procedure for one or more channels in the unlicensed spectrum, determine that the one or more channels are clear based at least in part on the performed LBT procedure, and transmit the frame based at least in part on the determination.

In some examples of the method, apparatus, and non-transitory computer-readable medium described above, the signal includes a DRS within a temporally first subframe of the frame, where the at least one repetition of the signal includes a repetition of the DRS within one or more subsequent subframes of the frame. In some examples of the method, apparatus, and non-transitory computer-readable medium described above, the signal includes a synchronization signal within a DRS subframe of the frame, where the at least one repetition of the signal includes a repetition of the synchronization signal within the DRS subframe.

In some examples of the method, apparatus, and non-transitory computer-readable medium described above, the signal includes an eMPDCCH within a temporally second subframe of the frame. In some examples of the method, apparatus, and non-transitory computer-readable medium described above, the signal includes a set of CRSs within a temporally first subframe of the frame, where the at least one repetition of the signal includes a repetition of the CRSs over a set of subsequent subframes.

In some examples of the method, apparatus, and non-transitory computer-readable medium described above, the signal includes an eMPDCCH within a subframe of the frame, where the at least one repetition of the signal includes a frequency domain repetition of the eMPDCCH within a transmission opportunity as the subframe. In some examples of the method, apparatus, and non-transitory computer-readable medium described above, the signal includes a PDSCH within a first subframe of the frame, where the at least one repetition of the signal includes a repetition of the PDSCH within additional subframes of a transmission opportunity including the first subframe. In some examples of the method, apparatus, and non-transitory computer-readable medium described above, the signal includes a PDSCH within a subframe of the frame, where the at least one repetition of the signal includes a time-domain repetition of the PDSCH within a transmission opportunity including the subframe and a subsequent transmission opportunity.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
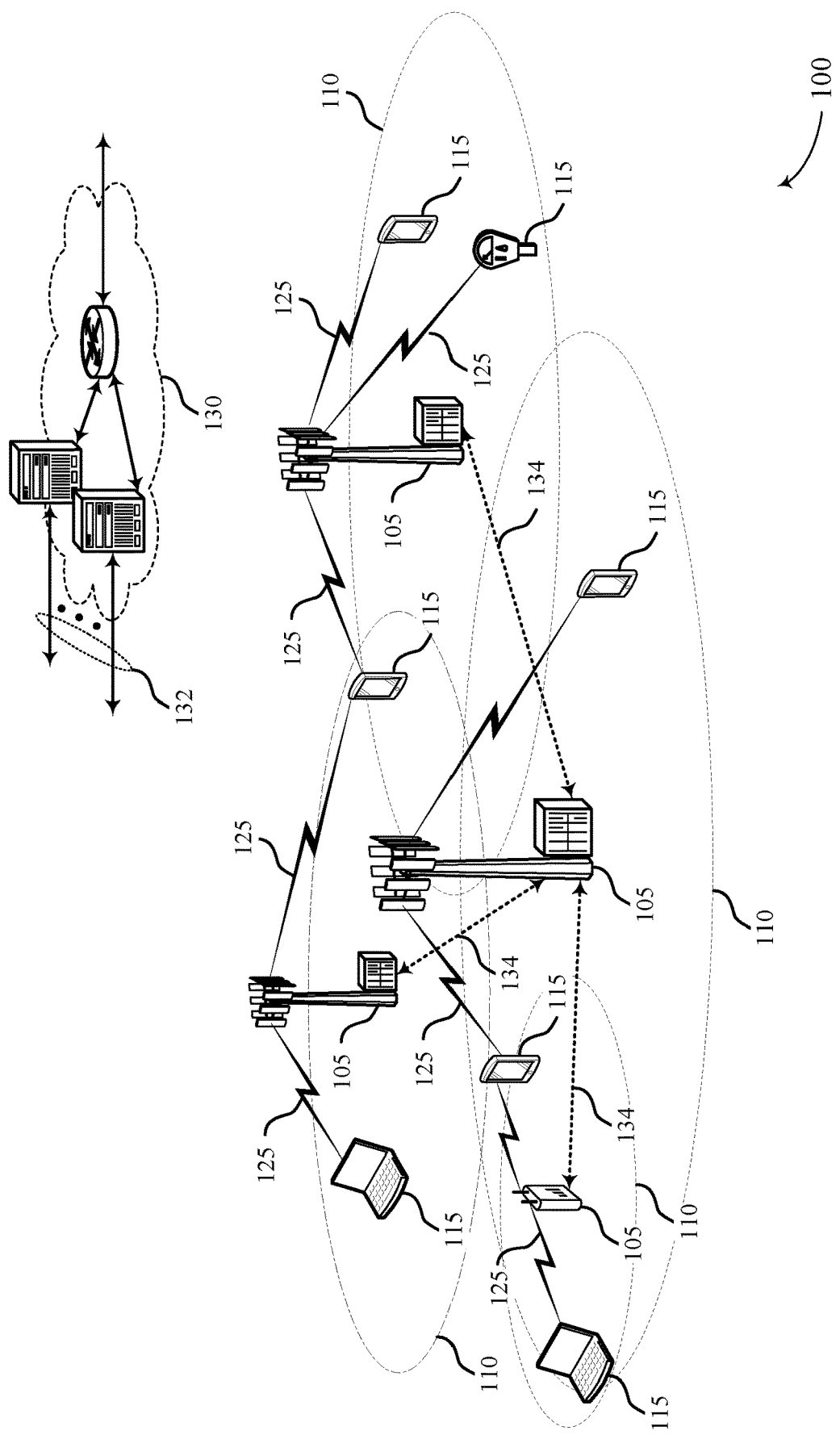
FIG. 1 illustrates an example of a wireless communications system that supports unlicensed spectrum coverage enhancement for industrial Internet of Things (IoT).

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), LTE-Advanced (LTE-A), Advanced Mobile Phone Service (AMPS) or other known signals that are used to communicate within a wireless, cellular or Internet of Things (IoT) network, such as a system utilizing 3G, 4G or 5G, or further implementations thereof, technology.

Generally, the described techniques provide for the repetition of multiple symbols to increase a device's ability to synchronize and communicate using unlicensed spectrum. For example, a base station may schedule a frame that includes multiple repetitions, in time or frequency, of a control or data signal. After determining that a channel within unlicensed spectrum is clear using a listen before talk (LBT) procedure, the base station may broadcast or transmit the frame to one or more devices, such as a user equipment (UE) or machine type communication (MTC) device. In some cases, the frame may include multiple repetitions of a discovery reference signal (DRS), and may be broadcast by the base station to enable synchronization with the base station by a UE. In other examples, the signal may include repetitions of a cell-specific reference signal (CRS), and upon receipt of the CRSs, a UE may identify a start of a transmission opportunity (TxOP) in unlicensed spectrum. Other signals, such as downlink control and shared channels, may be repeated within a frame transmission in a similar manner to ensure receipt by the UE. Additionally, the UE may transmit a frame that includes repetitions of a control or data signal when communicating with the base station.

In some cases, reliance on unlicensed radio frequency spectrum for wireless communications is associated with particular deployments and market needs. For example, licensed spectrum may be too costly to use for an IoT network operated by a particular industry, manufacturer, and the like. Such industrial applications of IoT may accordingly focus on communications schemes that use wideband or in-band operation in an unlicensed or contention-based spectrum.

Wireless communications systems for industrial IoT may be associated with a number of coverage requirements to ensure efficient operation. As an example, industry applications including automated guided vehicles (AGVs) (such as AGVs used for cargo handling or robotic vehicles in a factory) may have a minimum operational bandwidth requirement (such as 150 kbps). There also may be requirements for minimum coverage provided by wireless communications systems using unlicensed spectrum, such as three times the coverage provided by Wi-Fi, for example, with corresponding signal gains (such as at least a 16 dB gain over Wi-Fi). As a result, techniques to achieve coverage enhancement, particularly for downlink signaling, in unlicensed spectrum may be desirable to ensure operation within environments or deployments associated with operational requirements.

Operational requirements in an industrial IoT environment may be met through a repetition of a number of data and control signals within uplink and downlink transmissions. That is, through the repetition of various signals (such as DRSs, CRSs, physical uplink and downlink control channels, physical uplink and downlink shared channels, and other data or control signals), a signal-to-noise ratio (SNR) may be increased to allow for greater coverage and operability for wireless devices using unlicensed spectrum.

For example, repetitions of a DRS may enable a device, such as a UE or MTC device, to identify synchronization timing or a system bandwidth associated with a base station. In such cases, a base station may first complete a clear channel assessment (CCA) (such as an LBT procedure) to ensure a channel is not occupied with wireless traffic, and then broadcast multiple subframes, where each subframe is used for repetitions of DRS. These subframes may include 14 orthogonal frequency division multiplexing (OFDM) symbols that are used to transmit DRS. In some other examples, such as after synchronization, repetitions of CRS may be used by a UE to detect a start of a TxOP. Repetition of control and data signals may be transmitted by both base stations and UEs.

Particular implementations of the subject matter described in this disclosure can be implemented to realize one or more of the following potential advantages. A repetition of a data or control signal provides for an increased SNR associated with those signals. As a result, the increased SNR may improve overall connectivity for wireless devices. The increased SNR may be further applied to situations where a particular link budget may be used. The repetition of DRS, control, and data channels may further ensure a backward compatibility with legacy devices. That is, legacy devices (or devices that may not be configured to operate in a coverage enhancement mode) may operate without changes to the legacy devices, as they may continue to utilize signals that are present without the repetition of the various signals described herein. Additionally, devices that are capable of using the repetitions of the signals (such as IoT devices), may use these repetitions of DRS, or data and control channels for increased coverage operations, thereby enabling coexistence of different types of devices having various capabilities or configurations within the same system. Repetitions of a primary synchronization signal (PSS) and CRS enables transmission detection in unlicensed spectrum for increased coverage, enabling a UE to determine a starting point for a TxOP within a system.

Aspects of the disclosure are initially described in the context of a wireless communications system. Further examples are then provided of frames and subframes that include multiple transmissions of various control and data signals. Aspects of the disclosure are further illustrated by and described with reference to apparatus diagrams, system diagrams, and flowcharts that relate to unlicensed spectrum coverage enhancement for industrial IoT.

FIG. 1 illustrates an example of a wireless communications system 100 that supports unlicensed spectrum coverage enhancement for industrial IoT. The wireless communications system 100 includes base stations 105, UEs 115, and a core network 130. In some examples, the wireless communications system 100 may be an LTE (or LTE-A) network, or a New Radio (NR) network. In some cases, the wireless communications system 100 may support enhanced broadband communications, ultra-reliable (i.e., mission critical) communications, low latency communications, and communications with low-cost and low-complexity devices. The wireless communications system 100 may further enable synchronization and connectivity of devices operating in unlicensed spectrum through the repetition of data and control signals.

The base stations 105 may wirelessly communicate with the UEs 115 via one or more base station antennas. Each base station 105 may provide communication coverage for a respective geographic coverage area 110. Wireless communication links 125 shown in the wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (such as between a common control region and one or more UE-specific control regions).

The UEs 115 may be dispersed throughout the wireless communications system 100, and each UE 115 may be stationary or mobile. A UE 115 also may be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 also may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, a machine type communication (MTC) device, an appliance, an automobile, or the like.

In some cases, a UE 115 also may be able to communicate directly with other UEs (such as using a peer-to-peer (P2P) or device-to-device (D2D) protocol). One or more of a group of the UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In some other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The base stations 105 may communicate with the core network 130 and with one another. For example, base stations 105 may interface with the core network 130 through backhaul links 132 (such as S1, etc.). The base stations 105 may communicate with one another over backhaul links 134 (such as X2, etc.) either directly or indirectly (such as through core network 130). The base stations 105 may perform radio configuration and scheduling for communication with UEs 115, or may operate under the control of a base station controller (not shown). In some examples, base stations 105 may be macro cells, small cells, hot spots, or the like. The base stations 105 also may be referred to as eNodeBs (eNBs) 105.

In some cases, the wireless communications system 100 may utilize both licensed and unlicensed radio frequency spectrum bands. For example, the wireless communications system 100 may employ access technology in an unlicensed band such as the 5 Ghz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 115 attempting to access a wireless network may perform an initial cell search by detecting a PSS from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS also may enable detection of a duplexing mode and a cyclic prefix length. Some systems, such as TDD systems, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a physical hybrid automatic repeat request (HARD) indicator channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signals (SRSs), and cell barring.

Wireless communications systems may use a number of different frame configurations for uplink and downlink communications, and the pattern of subdivisions of radio frames in the time domain may be referred to as a frame structure. For example, the frame structure can be type 1 or type 2, where type 1 may be applicable to both full duplex and half duplex FDD, while type 2 may be applicable to TDD. Frame structure type 3 may include a burst of downlink subframes, followed by a special subframe (such as a subframe between downlink and uplink subframes that includes a downlink pilot time slot (DwPTS) region, a guard period, and an uplink pilot time slot (UpPTS) region). The special subframe may followed by a burst of uplink subframes. In some cases, the number of downlink and uplink subframes may be configured according to different communications schemes. For example, an uplink-to-downlink ratio of a type 3 frame may be dynamically configured via a common control channel (such as a common physical downlink control channel (CPDCCH)).

In some cases, a control channel may be transmitted using resources that would otherwise be used for data transmission (i.e., a physical downlink control channel (PDSCH)). These control channels may be known as enhanced physical downlink control channels (PDCCHs) or ePDCCHs. Each ePDCCH set may have 2, 4, or 8 resource block (RB) pairs. An ePDCCH may be scheduled using enhanced control channel elements (eCCE) and enhanced resource element groups (eREGs). The number of eCCEs used for an ePDCCH may depend on the aggregation level. In some cases, an ePDCCH may be UE specific. That is, ePDCCH may be transmitted exclusively using a UE-specific search space. In some cases, certain downlink control information (DCI) formats may be used to indicate information about a frame, such as a location of data or a demodulation scheme. In some cases, a UE 115 may support ePDCCH if it has a sufficiently fast decoder, as the ePDCCH is decoded at the end of a subframe (because portions of it may fall in each symbol of the subframe), whereas PDCCH may be transmitted using the first few symbols of a subframe.

PDCCH carries DCI in control channel elements (CCEs), which may consist of nine logically contiguous resource element groups (REGs), where each REG contains 4 resource elements (REs). DCI includes information regarding downlink (DL) scheduling assignments, uplink (UL) resource grants, transmission scheme, UL power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs multiple-input multiple-output (MIMO), the DCI must include additional signaling information. DCI size and format depend on the amount of information as well as factors such as bandwidth, the number of antenna ports, and duplexing mode.

The PUCCH may be mapped to a control channel defined by a code and two consecutive resource blocks. UL control signaling may depend on the presence of timing synchronization for a cell. PUCCH resources for scheduling request (SR) and channel quality information (CQI) reporting may be assigned (and revoked) through radio resource control (RRC) signaling. In some cases, resources for SR may be assigned after acquiring synchronization through a RACH procedure. In other cases, an SR may not be assigned to a UE 115 through the RACH (i.e., synchronized UEs may or may not have a dedicated SR channel). PUCCH resources for SR and CQI may be lost when the UE is no longer synchronized.

HARQ may be a method of ensuring that data is received correctly over a wireless communication link 125. HARQ may include a combination of error detection (such as using a CRC), forward error correction (FEC), and retransmission (such as an automatic repeat request (ARQ)). HARQ may improve throughput at the medium access control (MAC) layer in poor radio conditions (such as signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgment (NACK) indicating a failed attempt to decode the information.

MIMO wireless systems use a transmission scheme between a transmitter (such as a base station 105) and a receiver (such as a UE 115), where both transmitter and receiver are equipped with multiple antennas. Some portions of the wireless communications system 100 may use beamforming. For example, a base station 105 may have an antenna array with a number of rows and columns of antenna ports that the base station 105 may use for beamforming in its communication with a UE 115. Signals may be transmitted multiple times in different directions (such as each transmission may be beamformed differently).

A resource element may include one symbol period and one subcarrier (such as a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support the repetition of multiple symbols to increase a device's ability to synchronize and communicate using unlicensed spectrum. For example, a base station 105 may schedule a frame that includes multiple repetitions, in time or frequency, of a control or data signal. After determining that a channel within unlicensed spectrum is clear using a LBT procedure, the base station may broadcast or transmit the frame to one or more devices, such as a UE 115 or MTC device. For instance, the frame may include multiple repetitions of a DRS, and may be broadcast by the base station to enable synchronization with the base station by a UE 115. In other examples, the signal may include repetitions of a CRS, and upon receipt of the CRSs, a UE 115 may identify a start of a TxOP in unlicensed spectrum. Other signals, such as downlink control and shared channels, may be repeated within a frame transmission in a similar manner to ensure receipt by the UE 115. Additionally, the UE 115 may transmit a frame that includes repetitions of a control or data signal when communicating with the base station.

Figure 2:
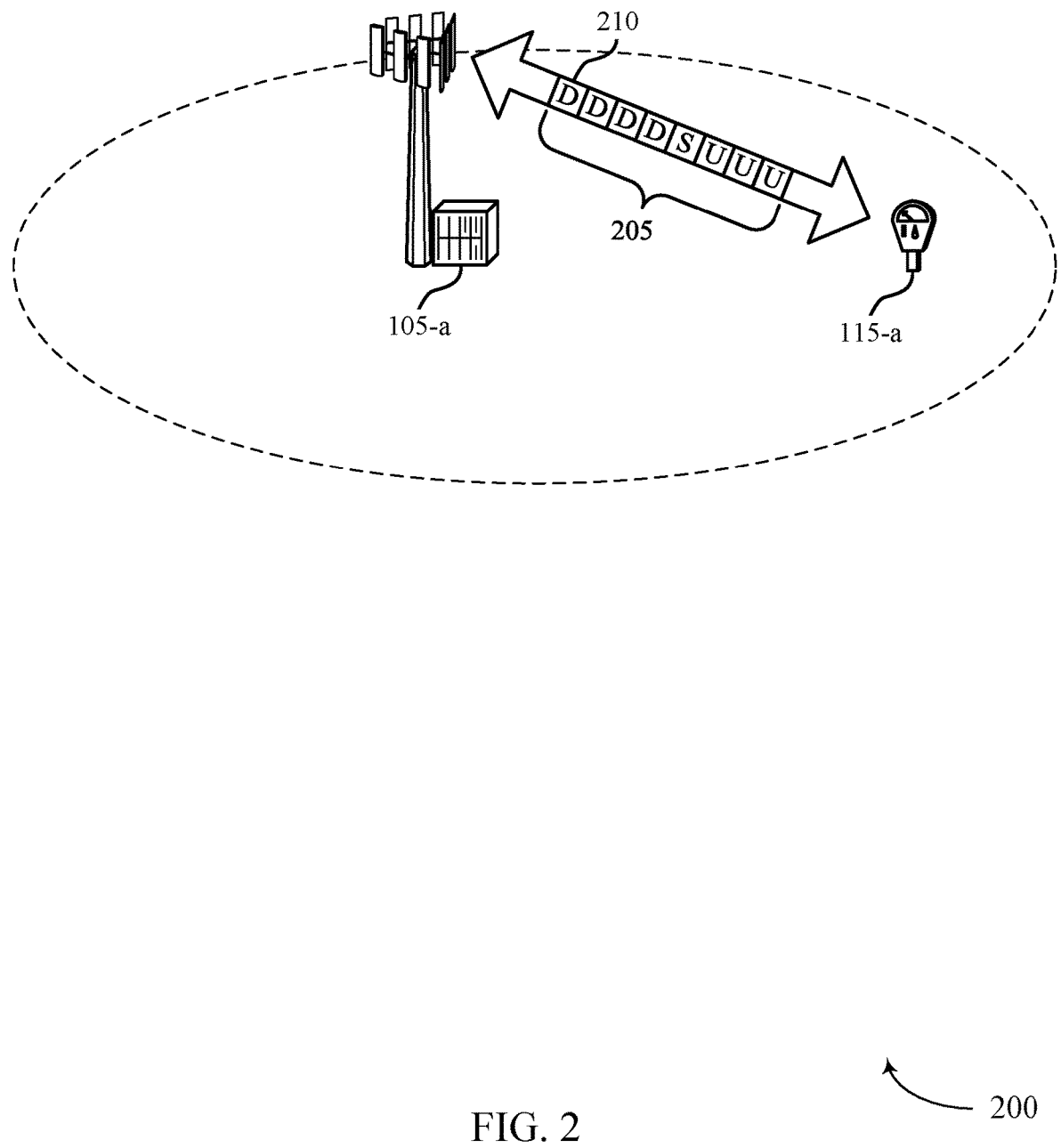
FIG. 2 illustrates an example of a wireless communications system that supports unlicensed spectrum coverage enhancement for industrial IoT.

FIG. 2 illustrates an example of a wireless communications system 200 that supports unlicensed spectrum coverage enhancement for industrial IoT. The wireless communications system 200 may be an example of an IoT or industrial IoT network including a base station 105-*a* and a UE 115-*a*, which may be examples of the corresponding devices described with reference to FIG. 1. For example, the UE 115-*a* may be an example of an IoT device, an MTC device, or an AGV. In the wireless communications system 200, coverage enhancement (such as increased coverage and higher SNR for transmissions) may be achieved through a repetition of a number of signals within uplink and downlink transmissions. That is, through the repetition of various signals (such as DRSs, CRSs, physical uplink and downlink control channels, physical uplink and downlink shared channels and the like), an improved SNR may provide coverage for devices within wireless communications system 200, such as UE 115-*a*.

The base station 105-*a* and the UE 115-*a* may communicate with each other using unlicensed spectrum. For example, the base station 105-*a* or the UE 115-*a* may perform a CCA or LBT procedure prior to transmitting a frame 205 that includes a number of subframes 210. The subframes 210 may be configured for downlink communications from the base station 105-a to the UE 115-a, or configured for uplink communications from the UE 115-a to the base station 105-a. Between the subframes 210 configured for downlink and subframes 210 configured for uplink transmissions, a special subframe may be used, where the special subframe may include a guard period to control switching between downlink and uplink subframes.

In some cases, the frame 205 may be associated with a certain frame structure type (such as frame structure type 3), where a number of downlink and uplink subframes may be configured. For example, an uplink-to-downlink ratio of frame 205 may be dynamically configured, where the UE 115-a may determine the uplink-to-downlink ratio following the combination of repetitions of PDCCH within frame 205 (such as the base station 105-a indicating a subframe configuration to the UE 115-a). Additionally or alternatively, the frame 205 may include semi-statically configured subframes 210, and the UE 115-a may be aware of a corresponding uplink-to-downlink ratio based on the semi-static configuration.

The base station 105-a may use the frame 205 to broadcast or transmit a repetition of a number of downlink signals. That is, data or control signals may be repeated within the frame 205 or within one or more subframes 210. For example, as a result of the use of unlicensed spectrum, the UE 115-a may not be immediately aware of signals transmitted by base station 105-a. The base station 105-a may thus broadcast a periodic DRS (such as DRS with a periodicity of one DRS subframe every 80 ms or more). However, to increase the SNR associated with a DRS broadcast, the base station 105-a may transmit repetitions of the DRS over a number of consecutive subframes 210. As a result, the UE 115-a may combine DRS over a number of subframes 210 to determine if there is a starting transmission of DRS. In other examples, and as discussed below, a number of different data and control signals may repeated within the frame 205, within subframes 210, within a TxOP that includes the frame 205, or over multiple TxOPs.

Repetitions of downlink shared channel transmissions may correspond to a repetition of downlink control channels. For example, PDSCH transmissions may be repeated according to PDCCH repetitions as described below, where there may be a one-to-one mapping to the scheduling of PDCCH in each subframe. Similarly, the number of repetitions of the downlink shared channel transmissions may be indicated by $N_{rep}$ according to a DCI format. In such cases, a device may store $N_{rep}$ PDSCH subframes before decoding a repeated PDCCH, where the $N_{rep}$ PDSCH subframes may be followed by scheduled PDCCHs.

Uplink signals from the UE 115-a also may be repeated. For instance, an uplink shared channel (such as PUSCH) may be repeated, where PUSCH may be repeated $N_{rep}$ times as indicated by a downlink control channel (such as PDCCH), where $N_{rep}$ represents a number of repetitions. In such cases, the scheduling of the PUSCH may satisfy a scheduling constraint (such as an n+4 scheduling constraint). In some examples, the transmission of PUSCH may continue from the first uplink subframe in a next TxOP if the repetition cannot complete in a current TxOP.

Additionally, uplink control signals (such as PUCCH) may be transmitted with repetitions by the UE 115-a. Some PUCCH transmissions may be associated with certain SNR characteristics, such as a short PUCCH (sPUCCH) transmission associated with a −6 dB SNR for a 1×2 uplink antenna configuration and a payload of 10 bits. Additionally, a scheduled ePUCCH (such as an ePUCCH scheduled by a resource grant provided by the base station 105-a) may be associated with a SNR of −6 dB for a 1×2 uplink antenna configuration and a payload of 50 bits. In some cases, the UE 115-a may use a periodic PUCCH to provide HARQ feedback to the base station 105-a.

To provide for the transmission of PUCCHs that enable coverage enhancement, a 14 symbol non-scheduled ePUCCH may be used. For example, the non-scheduled ePUCCH may be transmitted within an uplink subframe that immediately follows a special subframe within the frame 205. The ePUCCH may be triggered by the same mechanism as sPUCCH (such as in every TxOP) and may not be DCI granted, which may reduce the payload of DCI. The ePUCCH within the uplink subframe following the special subframe may extend a number of symbols used for HARQ feedback. Additionally, a grant may indicate a number of repetitions of the scheduled ePUCCH, and the ePUCCH may be repeated in a similar method as repetitions of PUSCH described above.

In some cases, when accessing a network, the UE 115-a may use random access procedures. For example, the UE 115-a may use a physical random access channel (PRACH) or enhanced PRACH (ePRACH) to transmit an encoded random access preamble to initiate an access procedure with the base station 105-a. In some cases, PRACH may be associated with a −14 dB SNR (such as with a 1×4 uplink antenna configuration); however, a repetition of ePRACH (such as two repetitions) may be sent in contiguous uplink subframes, which may be configured by RRC.

Figure 3:
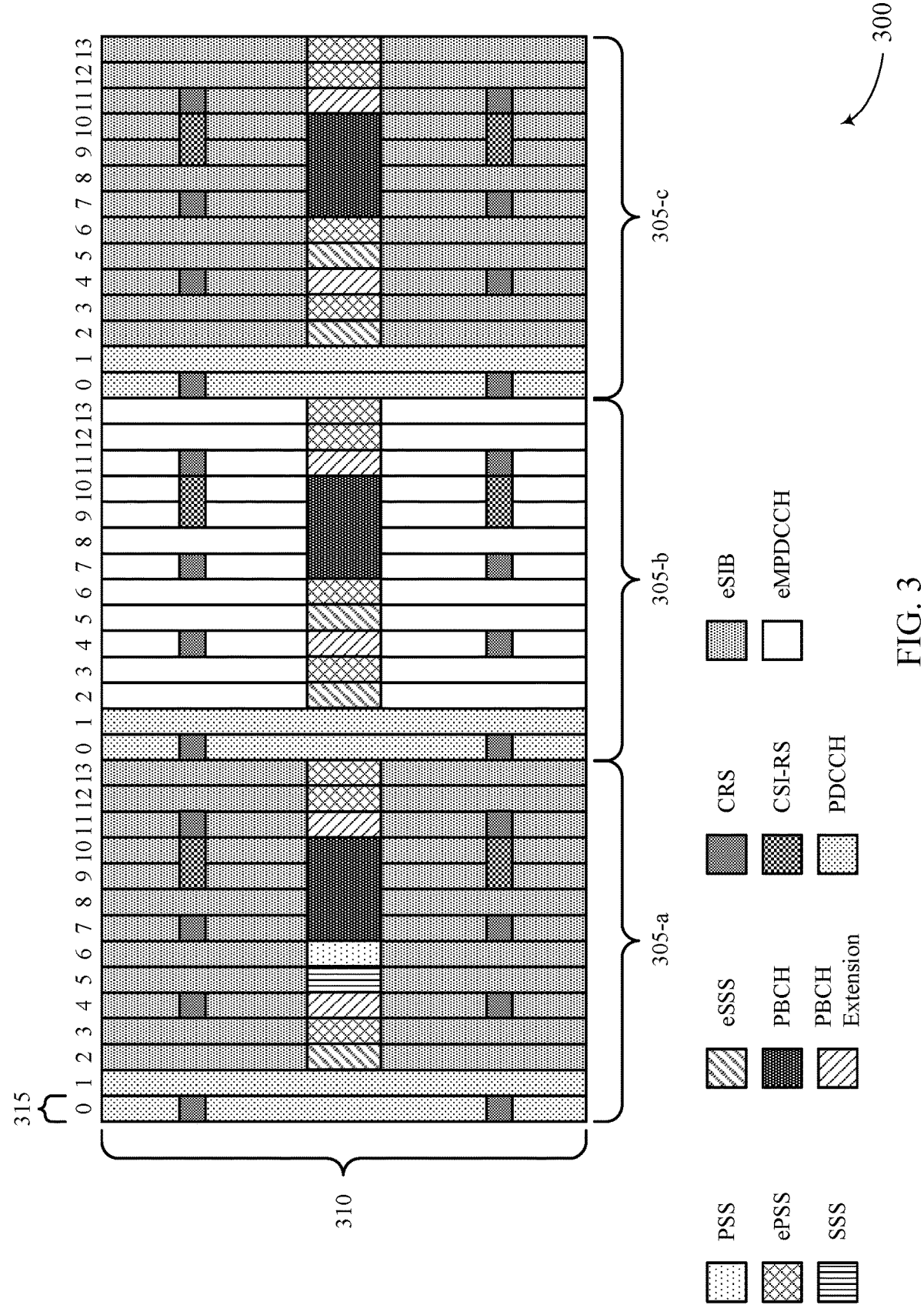
FIG. 3 illustrates an example of discovery reference signal (DRS) subframes that support unlicensed spectrum coverage enhancement for industrial IoT.

FIG. 3 illustrates an example of DRS subframes 300 that support unlicensed spectrum coverage enhancement for industrial IoT. The DRS subframes may represent an example of DRS subframes that are broadcast by a base station 105 and received by a UE 115. The DRS subframes 300 may be an example of DRS signals across multiple subframes used by a UE 115 to determine synchronization information, identify a system bandwidth, and identify SIB information from a base station 105.

In some cases, a multiple-subframe DRS may be used to improve medium access for a device, such as a UE 115. In such cases, an LBT scheme (such as a category 4 LBT scheme including a random back-off with a variable size contention window) may be used by a base station to support transmissions of DRS subframes 300 (such as multiple subframes carrying DRS). That is, a base station 105 may perform an extended CCA procedure, where the extended CCA may allow for the transmission of multiple DRS subframes. Additionally, a priority class may be configured according to a repetition number associated with a number of repetitions of the DRS. In some cases, the priority class may be configured depending on how much a link budget may be increased.

DRS subframes 300 may include a number of subframes 305 transmitted over a bandwidth 310 that carry DRS. For example, a temporally first subframe (such as first subframe 305-a) includes a DRS, and subsequent subframes (such as second subframe 305-b and third subframe 305-c) include repetitions of the DRS. In some cases, the DRS included in the first subframe 305-a may be used by any devices not configured for coverage enhancement, while coverage enhancement-capable devices may use DRS in second subframe 305-b and third subframe 305-c.

Each subframe 305 may include 14 OFDM symbols 315, where the DRS spans all 14 OFDM symbols 315, and the additional OFDM symbols 315 (relative to a 12-symbol subframe) may be used for repetitions of additional signals, such as a PSS, and channels, such as a PBCH. In some cases, synchronization signals may be repeated within each DRS transmission of DRS subframes 300, which may improve the detection of DRS transmissions. For example, the first subframe 305-a may include additional repetitions of PSS, referred to as enhanced PSS (ePSS), where ePSS may be included in symbols 12 and 13 of first subframe 305-a. An enhanced SSS (eSSS) and ePSS also may be scheduled in symbols 2 and 3, respectively. PSS and SSS may be repeated in a multiple DRS subframe scheme to enable fast acquisition of frames broadcast by a base station 105. As a result, a device may use the repetition of PSS or ePSS within DRS subframes 300 (such as 4 PSS/ePSS symbols in the 0 through nth subframe 305 carrying DRS) to determine a starting transmission timing of a DRS broadcast.

The second subframe 305-b and the third subframe 305-c may further be used for coverage enhancement of synchronization signals, PBCHs, and eSIBs. For example, the second subframe 305-b may include a DRS including additional repetitions of ePSS (such as in symbols 3, 6, 12, and 13) and repetitions of eSSS (such as in symbols 2 and 5). Additionally, it should be noted that while three subframes 305 are shown in the DRS subframes 300, a different number of subframes may be used for the broadcast of a multiple-subframe DRS.

A PDCCH may be used to schedule eSIB information, and a UE 115 may monitor a different location to determine a number of eSIBs transmitted for coverage enhancement. For example, the first subframe 305-a may include eSIB that may be accessed by non-coverage enhancement capable devices. Then scheduling of eSIBs used for the coverage enhancement mode may begin in the subsequent DRS subframe, including the second subframe 305-b. The second subframe 305-b may include an enhanced MTC PDCCH (eMPDCCH) (which may also be referred to as an ePDCCH), where the eMPDCCH at a certain subframe (n) may indicate the number of eSIB repetitions ($N_{rep}$) starting from the following subframe (subframe n+1). A receiving device may therefore combine $N_{rep}$ eSIB signals before decoding the received frame. In such cases, the eMPDCCH will indicate to a UE 115 how many repetitions of eSIB there will be in subframes 305 used to achieve a higher SNR, and the UE 115 may therefore identify how many subframes 305 to combine over time before trying to decode eSIB. In some cases, PBCH also may be repeated over n DRS subframes to support coverage enhancement.

Figure 4:
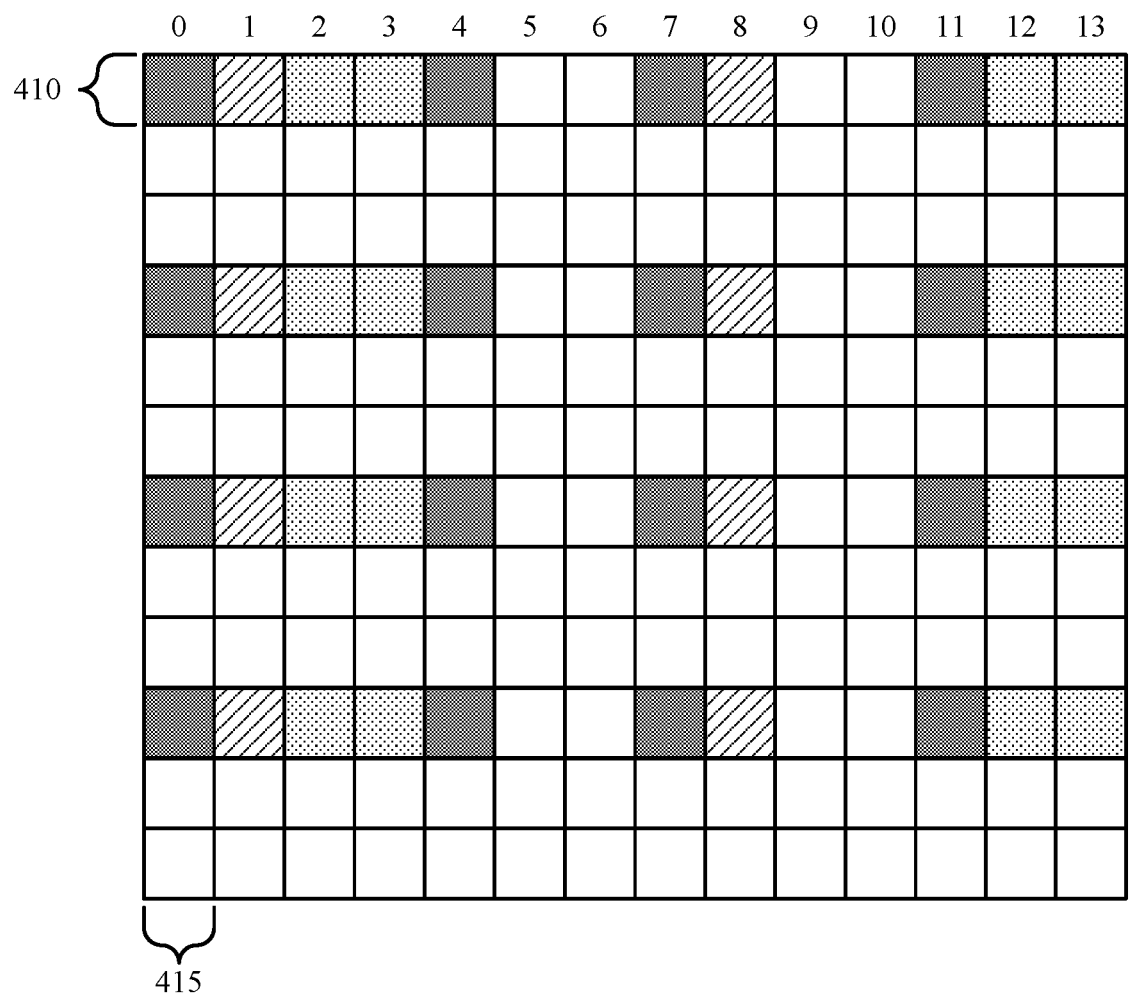
FIG. 4 illustrates an example of a subframe including repetitions of a cell-specific reference signal (CRS) that supports unlicensed spectrum coverage enhancement for industrial IoT.
Figure 4:
Figure 4:
Figure 4:

FIG. 4 illustrates an example of a subframe 400 including repetitions of a CRS that supports unlicensed spectrum coverage enhancement for industrial IoT. Subframe 400 may be an example of a downlink subframe transmitted by a base station 105 to a UE 115 after synchronization and a cell identifier (ID) is obtained, such as using DRS subframes 300 as described with reference to FIG. 3. The subframe 400 may include a number of tones 410 transmitted during multiple symbols 415. For example, the subframe 400 may include 14 symbols 415 and 12 tones 410. The subframe 400 may be an example of a subframe that is used for coverage enhancement by enabling a UE 115 to determine the start of a TxOP.

In some examples, the transmission of repeated signals may improve a device's ability for transmission detection. For instance, in unlicensed spectrum a device, such as a UE 115, may need to identify a start of a TxOP or a subframe transmission. In some wireless communications systems, a single CRS transmission (which may be decoded when a SNR is greater than −6 dB) may be used for transmission detection. Accordingly, the single CRS transmission may be insufficient when detection at a lower SNR is desired, such as in an industrial IoT scheme. Accordingly, the repetition of CRS across multiple subframes or within the same subframe may enable coverage enhancement within a system.

In a first example, the device may combine repetitions of CRS across multiple symbols 415 within subframe 400. That is, CRS may be repeated over multiple symbols 415 in the same subframe 400. As an example, a CRS for antenna ports 0 and 1 (CRS AP 0/1 420), may be transmitted during symbols 0, 4, 7, and 11 of subframe 400. A repetition of the CRS for antenna ports 0/1 (CRS Repetition AP 0/1 425) may be transmitted in symbols 2, 3, 12, and 13 of subframe 400. Additionally, CRS for antenna ports 2 and 3 (CRS AP 2/3 430) may occupy symbols 1 and 8 of subframe 400.

As a result, the transmission detector of the device may combine multiple CRS symbols (such as up to 8 CRS symbols) that enables an amount of gain for coverage enhancement schemes (such as 9 dB gain). In some cases, the use of CRS repeated over multiple symbols 415 within the subframe 400 may reduce the amount of time for a device to detect the beginning of a TxOP or subframe transmission. In another example, the CRS may be combined over multiple subframes (not shown), where a transmission detector at a device combines multiple symbols including CRS across multiple subframes (such as symbols n, n+4, n+7, n+11, n+14, . . . ) to detect a start of a TxOP.

Figure 5:
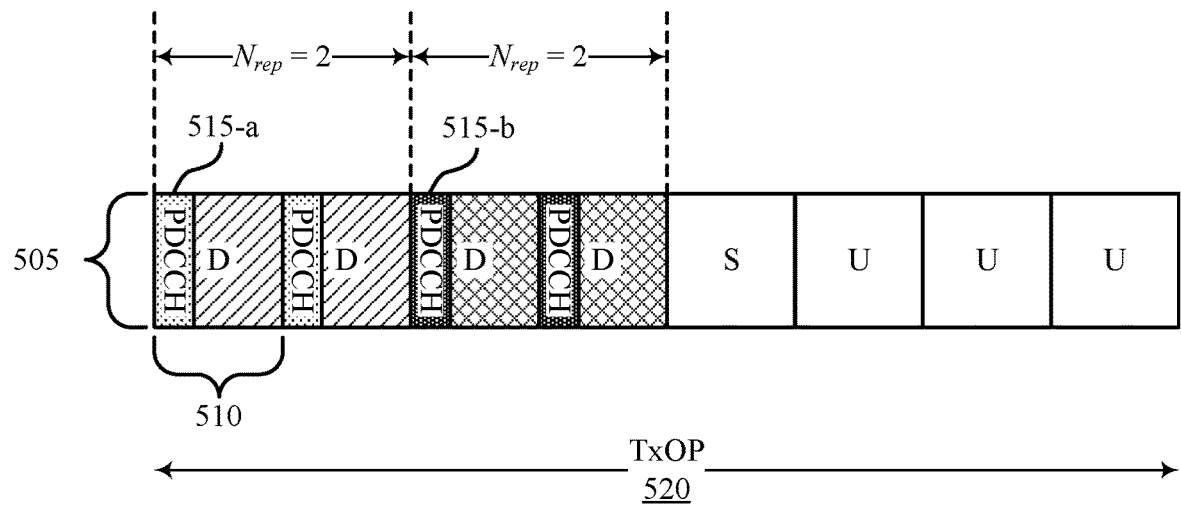
FIGS. 5 through 8 illustrate examples of frame configurations that support unlicensed spectrum coverage enhancement for industrial IoT.

FIG. 5 illustrates an example of a frame configuration 500 that supports unlicensed spectrum coverage enhancement for industrial IoT. The frame configuration 500 may include a frame 505 with a number of subframes 510 configured as downlink, uplink, or special subframes. The frame configuration 500 may be used by a base station 105 to transmit repetitions of a downlink control signals over multiple subframes 510.

Repetitions of downlink control signals, such as PDCCH, also may be transmitted to provide for coverage enhancement to wireless devices. Some wireless communications systems may be associated with a certain SNR requirement (such as a −6 dB SNR with an aggregation level of 8, with a 4×2 antenna configuration for downlink transmissions and a 1×4 antenna configuration for uplink transmissions). Accordingly, a number of repetitions may be used to achieve a desired SNR for a coverage enhancement scheme (such as −14 dB).

Using the frame configuration 500, a PDCCH may be repeated, for example, six times to achieve a SNR that enables increased SNR in unlicensed spectrum. In such cases, the PDCCH may start at a certain subframe 510 (such as an $i_{SF}$-th subframe) after an LBT process has cleared. The $i_{SF}$-th subframe 510 may provide a fixed starting point to accumulate a number of PDCCHs for decoding purposes. In some cases, frame 505 may have a semi-statically determined uplink-to-downlink ratio of subframes. In some cases, the repetition of the downlink control channel may be within a same TxOP 520 (such as intra-TxOP repetition), where the number of repetitions ($N_{rep}$) may be less than a number of downlink subframes ($N_D$).

The repetitions of the downlink control channel may be transmitted in accordance with the equation $i_{SF}$ mod $N_D = m*N_{rep}$, where there may not be any cross-TxOP repetition. In some cases, $N_{rep}$ may be chosen such that $N_D$ is divided to avoid gaps in downlink subframes. As illustrated in FIG. 5, $N_{rep}$ may be equal to 2, and a PDCCH 515-a may be repeated in a next subframe 510.

Repetitions of the PDCCH 515 may be started in a temporally first subframe or in a later subframe. For example, repetitions of a PDCCH 515-b may begin at a temporally third subframe 510, such as when $N_{rep}=2$, where a base station 105 may transmit two independent PDCCHs 515 during the TxOP 520. As a result, a UE 115 may only need to decode the PDCCH 515-*a* and the PDCCH 515-*b* in their respective subframes 510, and may refrain from decoding every subframe 510 of frame 505. In the example of FIG. 5, a UE 115 may identify two fixed accumulation or starting points for decoding the PDCCHs 515 with a repetition level of 2, and the UE 115 may not need to look at a candidate of $N_{rep}=2$ which occupies a temporally first or second subframe 510.

Figure 6:
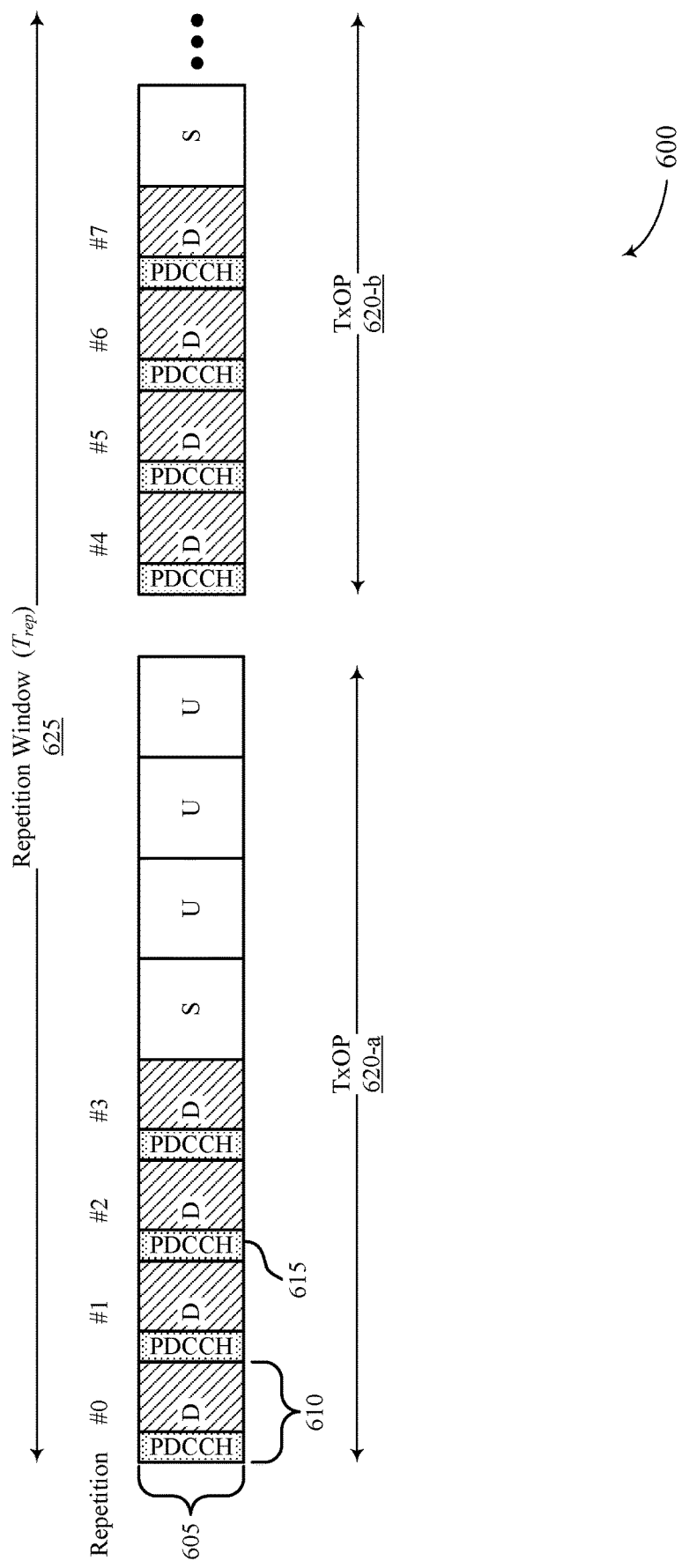

FIG. 6 illustrates an example of a frame configuration 600 that supports unlicensed spectrum coverage enhancement for industrial IoT. The frame configuration 600 may include multiple frames 605 that include a number of subframes 610 configured as downlink, uplink, or special subframes. The frame configuration 600 may be used by a base station 105 to transmit repetitions of a downlink control signals over multiple frames 605.

In some examples, a downlink control channel (such as a PDCCH 615) may be repeated across multiple TxOPs 620 (such as inter-TxOP repetition), where $N_{rep}$ is greater than $N_D$. In such cases, the repetitions may begin at a temporally first subframe 610 ($i_{SF}=0$) and extend to a next TxOP 620. For example, repetitions of the PDCCH 615 may begin during a temporally first subframe 610 during first TxOP 620-*a*, and may extend to a second TxOP 620-*b*. In this case, $N_{rep}$ may be chosen to be a multiple of $N_D$ so the repetitions cover the downlink subframes in the next TxOP to avoid a gap in downlink subframes. In some examples, a DCI format may include the repetition number ($N_{rep}$) that may be used to determine the ending point of the repetitions. Accordingly, a device may decode based on the number of repetitions of the downlink control channel.

$N_{rep}$ may be included in PDCCH such that, if a UE 115 can decode using a subframe 610 (such as subframe x) that is less than $N_{rep}$, the UE 115 may determine that a later number of repetitions may be redundant and may not be a new PDCCH. As a result, the UE 115 may not need to decode any PDCCH candidates starting from subframes x+1 through $N_{rep}$. For example, the UE 115 may monitor for a PDCCH with $N_{rep}=1$ in every subframe, and the UE 115 may refrain from decoding any PDCCH with a number of repetitions from subframes x+1 through $N_{rep}$ after successful decoding using a subframe x.

With inter-TxOP repetition as illustrated in FIG. 6, a repetition window 625 may be used to avoid excessive power consumption at a device (such as when an LBT process fails). The repetition window 625 may start from a starting subframe 610 ($i_{SF}$) and end with $i_{SF}+T_{rep}$, where $T_{rep}$ is the duration of the repetition window 625. In some examples, the device may report a decoding failure if there are no downlink shared channel (such as PDSCH) TxOPs within the repetition window 625. Additionally, the device may not combine any downlink control channels received outside of the repetition window. That is, a subsequent TxOP 620 may occur at a much later time, and by only combining the repetitions of PDCCH 615 received within the repetition window 625 a number of decoding candidates may be limited.

In some cases, a repetition number, $N_{rep}$, may be included as part of PDCCH repetitions to avoid variance in accumulation end points of different repetition numbers. For instance, a UE 115 may determine to decode repetition number $N_{rep}=2$ or $N_{rep}=4$. The UE 115 may thus attempt to decode at a temporally first, third, and fifth subframe 610 (such as subframe n=0, 2, 4) for $N_{rep}=2$, or attempt to decode at a temporally first and fifth subframe 610 (such as subframes n=0, 4) for $N_{rep}=4$. In some examples, the UE 115 may be able to decode a repetition after a temporally second subframe (n=1), and the UE 115 may determine that the next two subframes belong to the same PDCCH and will not try to use them to decode for $N_{rep}=2$.

Figure 7:
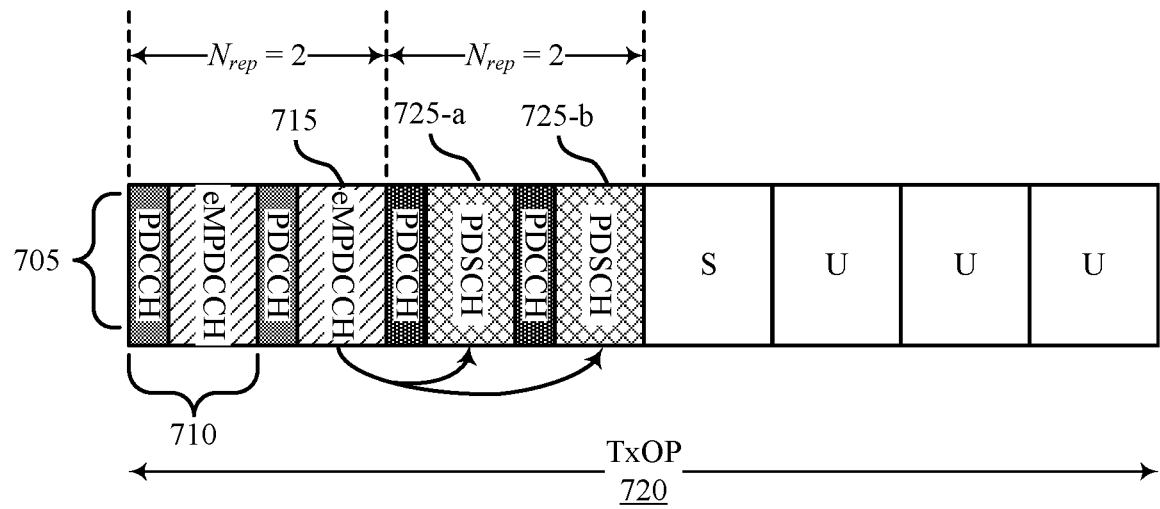

FIG. 7 illustrates an example of a frame configuration 700 that supports unlicensed spectrum coverage enhancement for industrial IoT. The frame configuration 700 may include a frame 705 with a number of subframes 710 configured as downlink, uplink, or special subframes. The frame configuration 700 may be used by a base station 105 to transmit repetitions of a downlink control signals, such as eMPDCCH, over multiple subframes 710.

In some examples, the downlink control signal may be repeated in the frequency domain (such as the repetition of a 6 RB eMPDCCH, where 48 resource blocks provide 8 repetitions of eMPDCCH). In such cases, a corresponding PDSCH may be scheduled in a subsequent subframe 710 (n+1). For example, an eMPDCCH 715 (or an ePDCCH) repeated within subframes 710 may schedule repetitions of PDSCH (such as PDSCH 725-*a* and PDSCH 725-*b*) in subsequent subframes 710. Additionally or alternatively, the scheduling of PDSCH may be modified or tightened from n+2, such as in MTC deployments, to avoid a gap.

The eMPDCCH 715 may include a repetition number for a control signal (such as $N_{rep,pdcch}$) and the repetition number of a scheduled PDSCH (such as $N_{rep,pdsch}$). That is, there may be multiple indications for a repetition level of various signals, where $N_{rep,pdcch}$ may signal a number of eMPDCCH repetition subframes 710 and $N_{rep,pdsch}$ may indicate a number of PDSCH repetition subframes 710.

In some examples, resources may be allocated for an entire bandwidth, where there may be an eMPDCCH limit to a 6 RB PDSCH, where $N_{rep,pdcch}=1$, in such cases. That is, a repetition over multiple subframe may not be used, such as when an eMPDCCH 715 has enough repetitions in the frequency domain within a subframe 710. Accordingly, $N_{rep,pdcch}=1$, but repetitions of a scheduled PDSCH may still be used, so $N_{rep,pdsch}$ may thus indicate a number of repetitions of PDSCH.

In some cases, the repetition of the downlink control channel also may be repeated in the time domain. The repetition may start at the $i_{SF}$th subframe 710 following the clearance of an LBT process, which may enable a fixed starting point to accumulate eMPDCCHs for decoding. The repetitions may be scheduled based on an intra-TxOP repetition scheme (where $N_{rep}<N_D$), where repetitions of eMPDCCH may be included within TxOP 720. The repetitions may begin according to $i_{SF}$ mod $N_D=m*N_{rep}$, with no cross-TxOP repetition after clearance of the LBT process. In some cases, $N_{rep}$ may divide the number of downlink subframes to decrease a number of gaps among downlink subframes.

Figure 8:
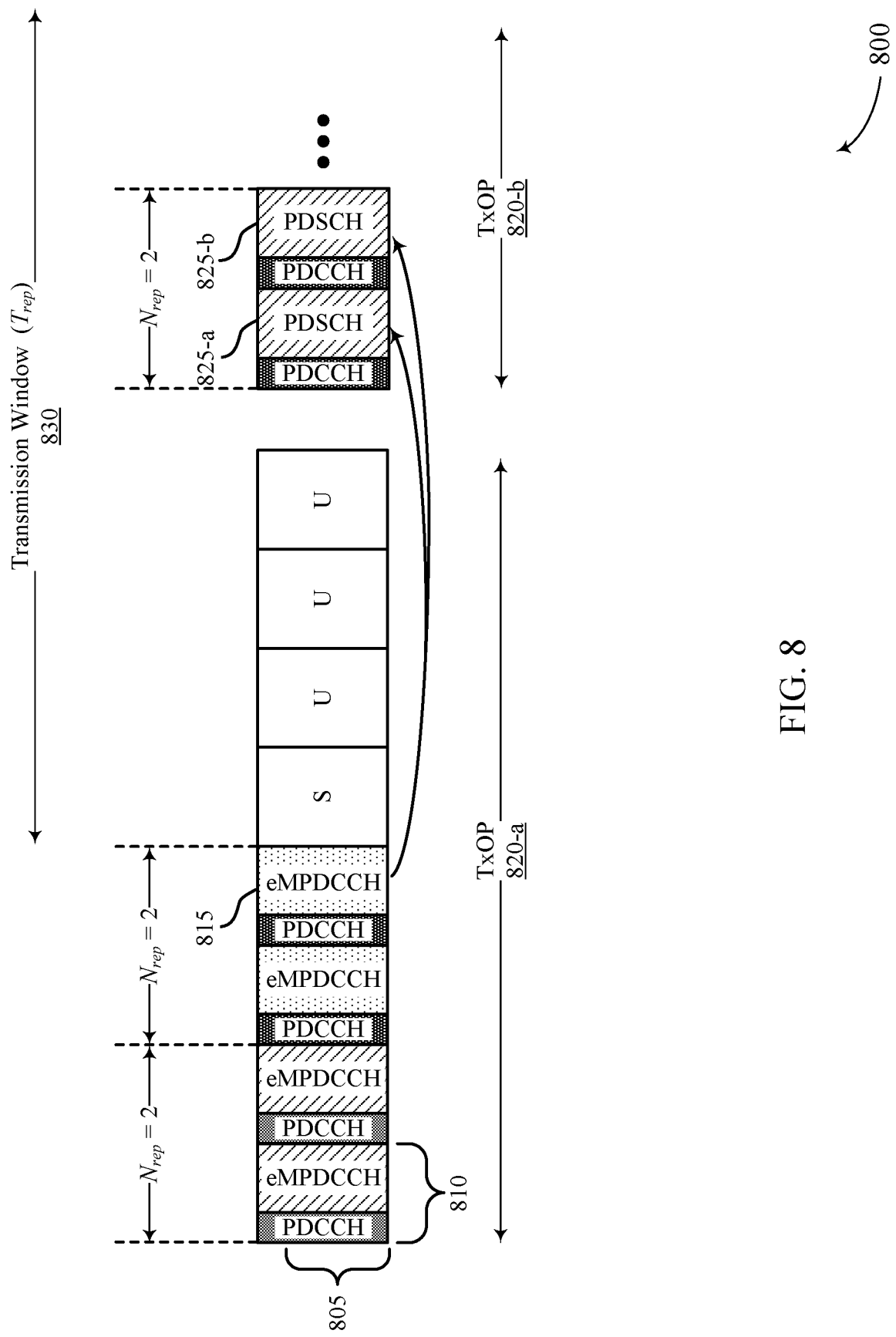

FIG. 8 illustrates an example of a frame configuration 800 for unlicensed spectrum coverage enhancement for industrial IoT. The frame configuration 800 may include a frame 805 with a number of subframes 810 configured as downlink, uplink, or special subframes. The frame configuration 800 may be used by a base station 105 to transmit repetitions of downlink data signals, such as PDSCH.

In some cases, downlink shared channels may be repeated as indicated by an eMPDCCH. In such cases, there may be no frequency hopping, and the repetition of PDSCH may start at a subframe 810 after clearing an LBT process. The repetition of the PDSCH in this case may follow decoding of a scheduling eMPDCCH in a current or previous TxOP, such as when eMPDCCH occupies a last downlink subframe 810. For example, eMPDCCH 815 within a first TxOP 820-*a* may be used to schedule repetitions of PDSCH (such as PDSCH 825-*a* and PDSCH 825-*b*) within a second TxOP 820-*b*.

The repetition of the PDSCH also may use the transmission window 830, $T_{rep}$, where $T_{rep}$ may start at subframe n+1 after a last eMPDCCH in subframe n. If there is no PDSCH TxOP after $T_{rep}$ (such as another TxOP 820 that includes a scheduled transmission of PDSCH), a decoding failure may be reported. This technique may avoid power consumption due to LBT failure. That is, a UE 115 may not wait for the multiple repetitions of the PDSCH after the transmission window 830 has expired.

Figure 9:
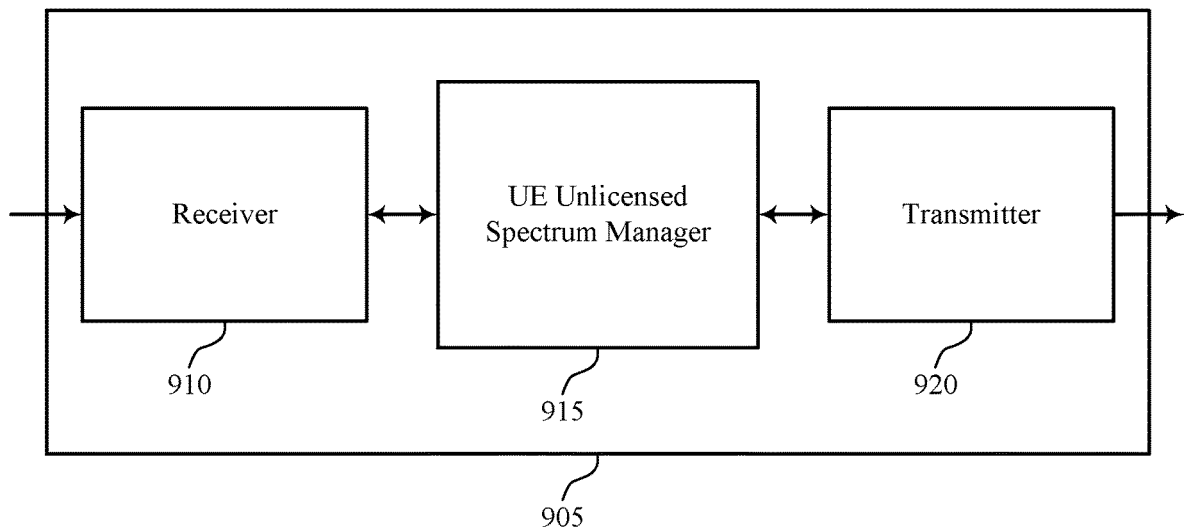
FIGS. 9 through 11 show block diagrams of devices that support unlicensed spectrum coverage enhancement for industrial IoT.

FIG. 9 shows a block diagram 900 of a wireless device 905 that supports unlicensed spectrum coverage enhancement for industrial. The wireless device 905 may be an example of aspects of a UE 115 as described with reference to FIG. 1. The wireless device 905 may include a receiver 910, a UE unlicensed spectrum manager 915, and a transmitter 920. The wireless device 905 also may include a processor. Each of these components may be in communication with one another (such as via one or more buses).

The receiver 910 may receive information such as packets, user data, or control information associated with various information channels (such as control channels, data channels, and information related to unlicensed spectrum coverage enhancement for industrial IoT, etc.). Information may be passed on to other components of the device. The receiver 910 may be an example of aspects of the transceiver 1235 described with reference to FIG. 12.

The UE unlicensed spectrum manager 915 may be an example of aspects of the UE unlicensed spectrum manager 1215 described with reference to FIG. 12. The UE unlicensed spectrum manager 915 may receive a first frame including a first signal and at least one repetition of the first signal in time or in frequency, the first signal including a data signal or a control signal. The UE unlicensed spectrum manager 915 also may communicate with a base station based on the received first frame (or based on information within the first frame). For example, the UE unlicensed spectrum manager may enable a UE 115 to synchronize timing with a base station 105, and followed by the reception of downlink signals, such as CRS, PDCCH, or PDSCH.

The transmitter 920 may transmit signals generated by other components of the device. In some examples, the transmitter 920 may be collocated with the receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
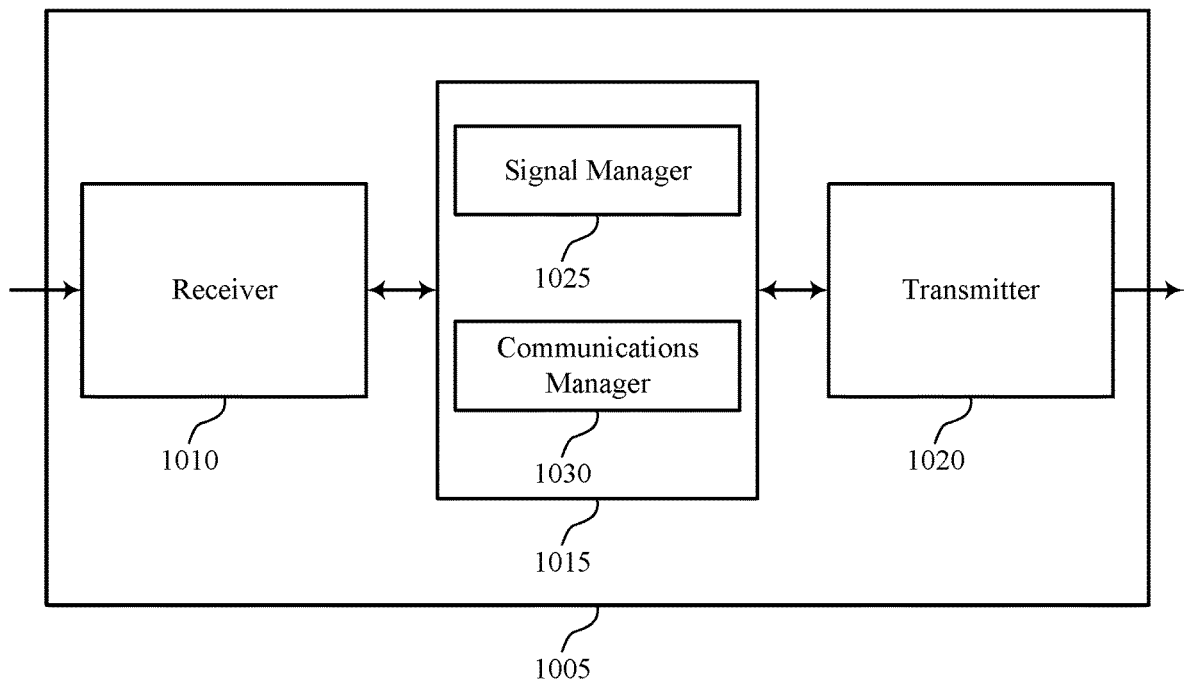

FIG. 10 shows a block diagram 1000 of a wireless device 1005 that supports unlicensed spectrum coverage enhancement for industrial IoT. The wireless device 1005 may be an example of aspects of a wireless device 905 or a UE 115 as described with reference to FIGS. 1 and 9. The wireless device 1005 may include a receiver 1010, a UE unlicensed spectrum manager 1015, and a transmitter 1020. The wireless device 1005 also may include a processor. Each of these components may be in communication with one another (such as via one or more buses).

The receiver 1010 may receive information such as packets, user data, or control information associated with various information channels (such as control channels, data channels, and information related to unlicensed spectrum coverage enhancement for industrial IoT, etc.). Information may be passed on to other components of the device. The receiver 1010 may be an example of aspects of the transceiver 1235 described with reference to FIG. 12.

The UE unlicensed spectrum manager 1015 may be an example of aspects of the UE unlicensed spectrum manager 1215 described with reference to FIG. 12. The UE unlicensed spectrum manager 1015 also may include a signal manager 1025 and a communications manager 1030.

The signal manager 1025 may receive a first frame including a first signal and at least one repetition of the first signal in time or in frequency, the first signal including a data signal or a control signal. In some cases, the first frame includes a semi-statically configured uplink-to-downlink ratio. In some examples, the first signal includes a synchronization signal within a DRS subframe of the received first frame, and the at least one repetition of the first signal may include a repetition of the synchronization signal within the DRS subframe. In some cases, the first signal includes an eMPDCCH within a temporally second subframe of the received first frame.

In other examples, the first signal includes a DRS within a temporally first subframe of the received first frame, where the at least one repetition of the first signal includes a repetition of the DRS within one or more subsequent subframes of the received first frame. Additionally or alternatively, the first signal includes a set of cell-specific reference signals CRSs within a temporally first subframe of the received first frame, where the at least one repetition of the first signal includes a repetition of the CRSs over a set of subsequent subframes. The first signal may include a set of CRSs within a subframe of the received first frame, where the at least one repetition of the first signal includes a repetition of the set of CRSs within a set of symbols within the subframe.

In some cases, the first signal includes a PDCCH within a temporally first subframe of the received first frame, where the temporally first subframe is within a first TxOP, and the at least one repetition of the first signal includes a repetition of the PDCCH within a subsequent TxOP. In some cases, the first signal includes an eMPDCCH within a subframe of the received first frame, where the at least one repetition of the first signal includes a frequency domain repetition of the eMPDCCH within a TxOP as the subframe.

The first signal also may include a PDSCH within a first subframe of the received first frame, where the at least one repetition of the first signal includes a repetition of the PDSCH within additional subframes of a TxOP including the first subframe. Alternatively, the first signal includes a PDSCH within a subframe of the received first frame, and where the at least one repetition of the first signal includes a time-domain repetition of the PDSCH within a TxOP including the subframe and a subsequent TxOP. In some examples, the first signal includes a PDCCH within a subframe of the received first frame, and where the at least one repetition of the first signal includes a repetition of the PDCCH within a same TxOP as the subframe.

The communications manager 1030 may communicate with a base station based on the received first frame. For example, the first frame may include data signals scheduled for the UE 115, and the UE 115 may respond with data or control signals based on received data from a base station. In some cases, the communications manager 1030 may determine a timing synchronization, a system bandwidth, and SIB information associated with a base station based at least in part on the DRS and the repetition of the DRS. The communications manager 1030 also may transmit a second frame including a second signal and at least one repetition of the second signal, the second signal including a PRACH), where the second signal and the at least one repetition of the second signal are located within contiguous subframes. In some cases, the communicating includes transmitting a second frame including a second signal and at least one repetition of the second signal in time, the second signal including a PUSCH, where the at least one repetition of the second signal is based on the received first signal. Additionally or alternatively, the communicating includes transmitting a second frame including a second signal and at least one repetition of the second signal, the second signal including a PUCCH, where the at least one repetition of the second signal is located within an uplink subframe following a special subframe.

The transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
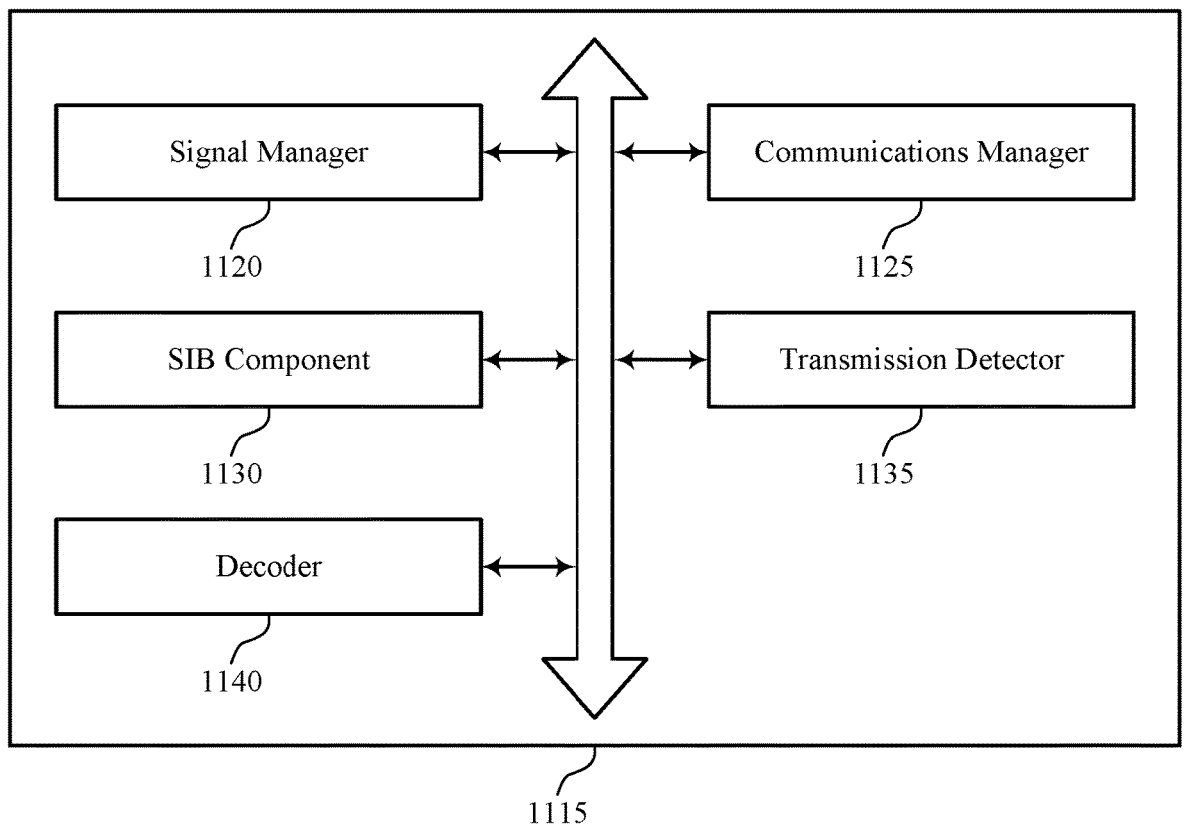

FIG. 11 shows a block diagram 1100 of a UE unlicensed spectrum manager 1115 that supports unlicensed spectrum coverage enhancement for industrial IoT. The UE unlicensed spectrum manager 1115 may be an example of aspects of a UE unlicensed spectrum manager 915, a UE unlicensed spectrum manager 1015, or a UE unlicensed spectrum manager 1215 described with reference to FIGS. 9, 10, and 12. The UE unlicensed spectrum manager 1115 may include a signal manager 1120, a communications manager 1125, a SIB component 1130, a transmission detector 1135, and a decoder 1140. Each of these modules may communicate, directly or indirectly, with one another (such as via one or more buses).

The signal manager 1120 may receive a first frame including a first signal and at least one repetition of the first signal in time or in frequency, the first signal including a data signal or a control signal. In some cases, the first frame includes a semi-statically configured uplink-to-downlink ratio. In some examples, the first signal includes a synchronization signal within a DRS subframe of the received first frame, and the at least one repetition of the first signal may include a repetition of the synchronization signal within the DRS subframe. In some cases, the first signal includes an eMPDCCH within a temporally second subframe of the received first frame.

In other examples, the first signal includes a DRS within a temporally first subframe of the received first frame, where the at least one repetition of the first signal includes a repetition of the DRS within one or more subsequent subframes of the received first frame. Additionally or alternatively, the first signal includes a set of cell-specific reference signals CRSs within a temporally first subframe of the received first frame, where the at least one repetition of the first signal includes a repetition of the CRSs over a set of subsequent subframes. The first signal may include a set of CRSs within a subframe of the received first frame, where the at least one repetition of the first signal includes a repetition of the set of CRSs within a set of symbols within the subframe.

In some cases, the first signal includes a PDCCH within a temporally first subframe of the received first frame, where the temporally first subframe is within a first TxOP, and the at least one repetition of the first signal includes a repetition of the PDCCH within a subsequent TxOP. In some cases, the first signal includes an eMPDCCH within a subframe of the received first frame, where the at least one repetition of the first signal includes a frequency domain repetition of the eMPDCCH within a TxOP as the subframe.

The first signal also may include a PDSCH within a first subframe of the received first frame, where the at least one repetition of the first signal includes a repetition of the PDSCH within additional subframes of a TxOP including the first subframe. Alternatively, the first signal includes a PDSCH within a subframe of the received first frame, and where the at least one repetition of the first signal includes a time-domain repetition of the PDSCH within a TxOP including the subframe and a subsequent TxOP. In some examples, the first signal includes a PDCCH within a subframe of the received first frame, and where the at least one repetition of the first signal includes a repetition of the PDCCH within a same TxOP as the subframe.

The communications manager 1125 may communicate with a base station based on the received first frame. In some examples, the communications manager 1125 may determine a timing synchronization, a system bandwidth, and SIB information associated with a base station based on the DRS and the repetition of the DRS. In some cases, the communicating includes transmitting a second frame including a second signal and at least one repetition of the second signal in time, the second signal including a PUSCH, and where the at least one repetition of the second signal is based on the received first signal. In other examples, the communicating includes transmitting a second frame including a second signal and at least one repetition of the second signal, the second signal including a PUCCH, where the at least one repetition of the second signal is located within an uplink subframe following a special subframe. In some cases, the communications manager 1125 may transmit a second frame including a second signal and at least one repetition of the second signal, the second signal including a PRACH, where the PRACH and the at least one repetition of the PRACH are located within contiguous subframes.

The SIB component 1130 may identify a set of SIBs within a subsequent subframe of the received first frame based on the eMPDCCH. Transmission detector 1135 may detect a start of a TxOP based at least on a combination of the set of CRSs in the temporally first subframe and the set of subsequent subframes, or detect a start of a TxOP based on a combination of the CRSs in the subframe. Additionally or alternatively, the SIB component 1130 may identify a starting point of the PDCCH based on the subframe, identify a starting point of the PDCCH based on the temporally first subframe, or identify a starting point of the eMPDCCH based on the subframe.

The decoder 1140 may decode the first frame based on the identified starting point of the PDCCH and an accumulation of the PDCCH within the same TxOP of the subframe, or may decode the first frame based on the starting point of the PDCCH and an accumulation of the PDCCH within the first TxOP and the subsequent TxOP. In some examples, the decoder 1140 may decode the first frame based on the starting point of the eMPDCCH and an accumulation of the eMPDCCH within the TxOP of the subframe, and may decode the PDSCH based on the PDSCH within the first subframe and the repetition of the PDSCH within the additional subframes.

Figure 12:
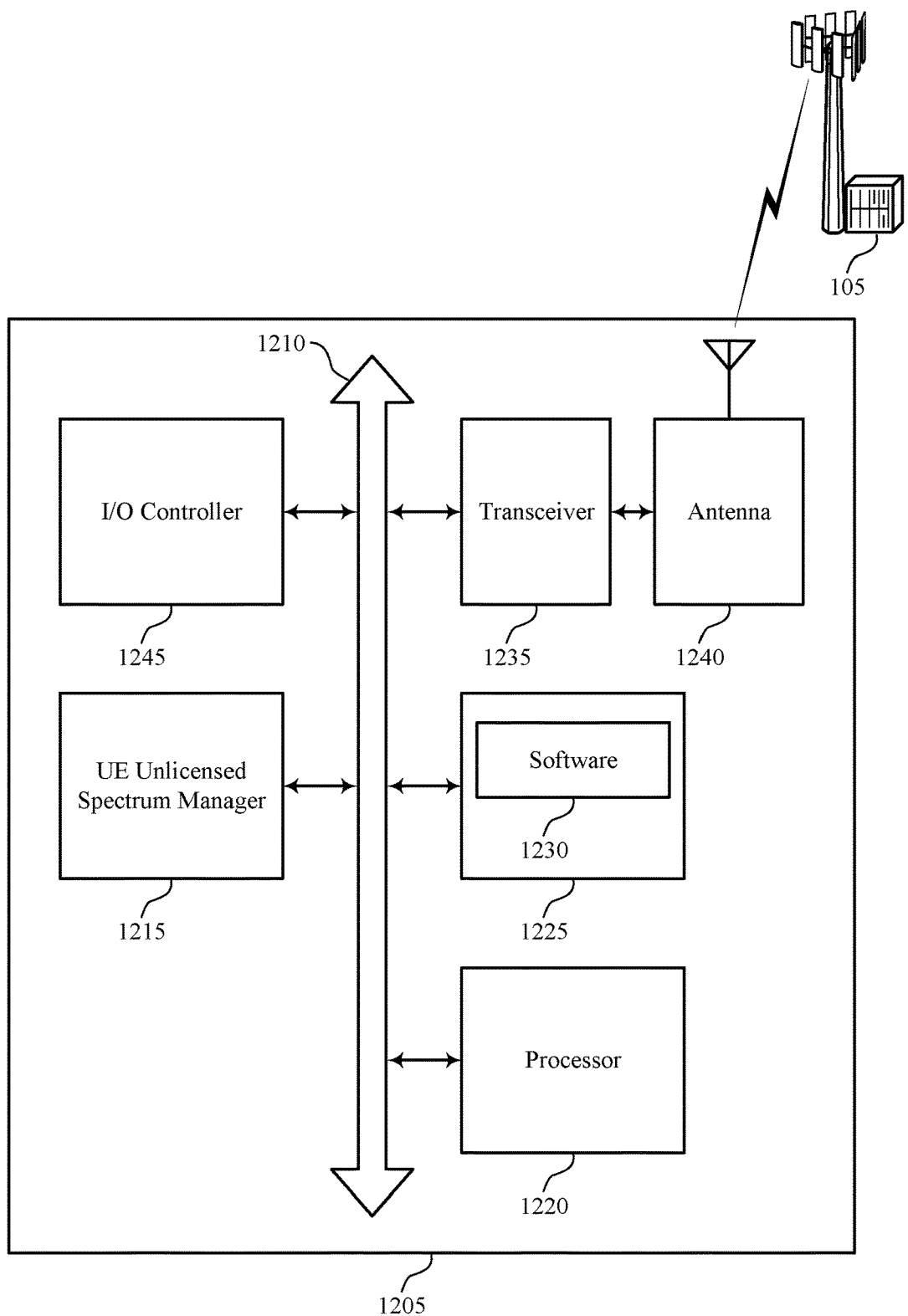
FIG. 12 illustrates a block diagram of a system including a user equipment (UE) that supports unlicensed spectrum coverage enhancement for industrial IoT.

FIG. 12 shows a diagram of a system 1200 including a device 1205 that supports unlicensed spectrum coverage enhancement for industrial IoT. The device 1205 may be an example of or include the components of a wireless device 905, a wireless device 1005, or a UE 115 as described above, such as with reference to FIGS. 1, 9 and 10. The device 1205 may include components for bi-directional voice and data communications including components for transmitting and receiving communications, including a UE unlicensed spectrum manager 1215, a processor 1220, memory 1225, software 1230, a transceiver 1235, an antenna 1240, and an I/O controller 1245. These components may be in electronic communication via one or more busses (such as a bus 1210). The device 1205 may communicate wirelessly with one or more base stations 105.

The processor 1220 may include an intelligent hardware device, (such as a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, the processor 1220 may be configured to operate a memory array using a memory controller. In other cases, a memory controller may be integrated into the processor 1220. The processor 1220 may be configured to execute computer-readable instructions stored in a memory to perform various functions (such as functions or tasks supporting unlicensed spectrum coverage enhancement for industrial IoT).

The memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

The software 1230 may include code to implement aspects of the present disclosure, including code to support unlicensed spectrum coverage enhancement for industrial IoT. The software 1230 may be stored in a non-transitory computer-readable medium such as system memory or other memory. In some cases, the software 1230 may not be directly executable by the processor but may cause a computer (such as when compiled and executed) to perform functions described herein.

The transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 also may include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions. The I/O controller 1245 may manage input and output signals for device 1205. The I/O controller 1245 also may manage peripherals not integrated into device 1205. In some cases, the I/O controller 1245 may represent a physical connection or port to an external peripheral. In some cases, the I/O controller 1245 may utilize an operating system such as iOS®, ANDROID®, MS-DOS®, MS-WINDOWS®, OS/2®, UNIX®, LINUX®, or another known operating system.

Figure 13:
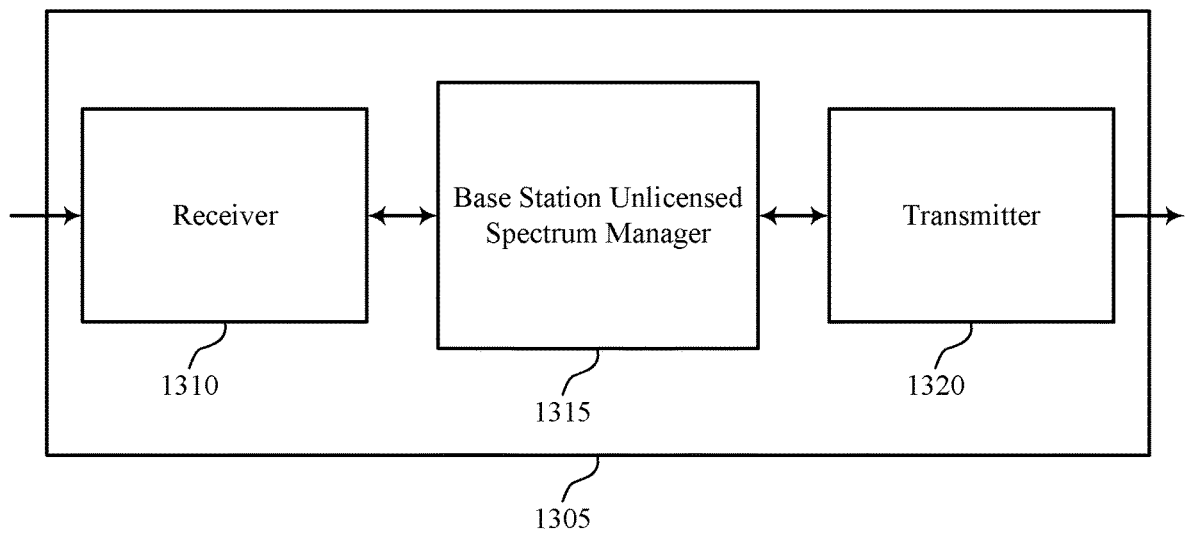
FIGS. 13 through 15 show block diagrams of devices that support unlicensed spectrum coverage enhancement for industrial IoT.

FIG. 13 shows a block diagram 1300 of a wireless device 1305 that supports unlicensed spectrum coverage enhancement for industrial IoT. The wireless device 1305 may be an example of aspects of a base station 105 as described with reference to FIG. 1. The wireless device 1305 may include a receiver 1310, a base station unlicensed spectrum manager 1315, and a transmitter 1320. The wireless device 1305 also may include a processor. Each of these components may be in communication with one another (such as via one or more buses).

The receiver 1310 may receive information such as packets, user data, or control information associated with various information channels (such as control channels, data channels, and information related to unlicensed spectrum coverage enhancement for industrial IoT, etc.). Information may be passed on to other components of the device. The receiver 1310 may be an example of aspects of the transceiver 1635 described with reference to FIG. 16.

Base station unlicensed spectrum manager 1315 may be an example of aspects of the base station unlicensed spectrum manager 1615 described with reference to FIG. 16. The base station unlicensed spectrum manager 1315 may generate a frame including a signal and at least one repetition of the signal in time or in frequency, the signal including a data signal or a control signal, perform an LBT procedure for one or more channels in the unlicensed spectrum, determine that the one or more channels are clear based on the performed LBT procedure, and transmit the frame based on the determination.

The transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
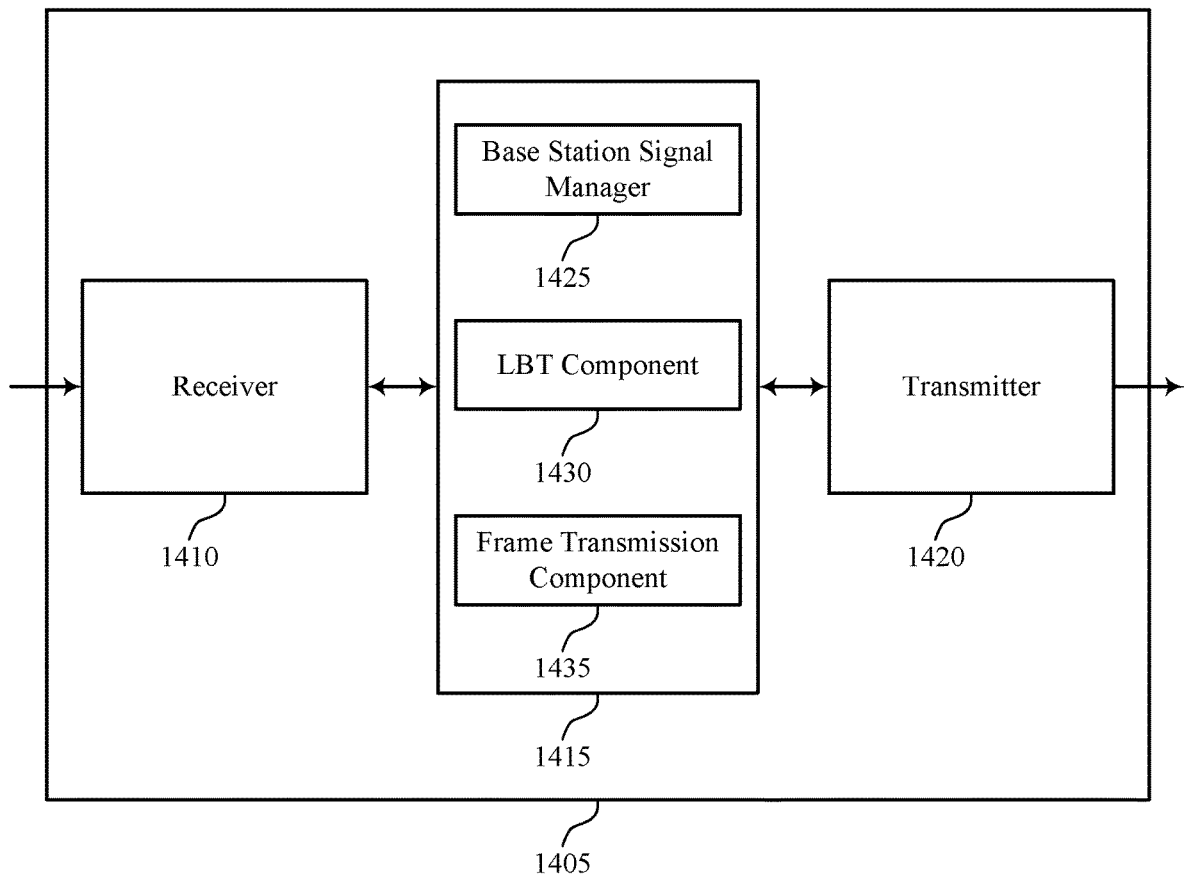

FIG. 14 shows a block diagram 1400 of a wireless device 1405 that supports unlicensed spectrum coverage enhancement for industrial IoT. The wireless device 1405 may be an example of aspects of a wireless device 1305 or a base station 105 as described with reference to FIGS. 1 and 13. The wireless device 1405 may include a receiver 1410, a base station unlicensed spectrum manager 1415, and a transmitter 1420. The wireless device 1405 also may include a processor. Each of these components may be in communication with one another (such as via one or more buses).

The receiver 1410 may receive information such as packets, user data, or control information associated with various information channels (such as control channels, data channels, and information related to unlicensed spectrum coverage enhancement for industrial IoT, etc.). Information may be passed to other components of the device. The receiver 1410 may be an example of aspects of the transceiver 1635 described with reference to FIG. 16.

The base station unlicensed spectrum manager 1415 may be an example of aspects of the base station unlicensed spectrum manager 1615 described with reference to FIG. 16. The base station unlicensed spectrum manager 1415 also may include a base station signal manager 1425, an LBT component 1430, and a frame transmission component 1435.

The base station signal manager 1425 may generate a frame including a signal and at least one repetition of the signal in time or in frequency, the signal including a data signal or a control signal. In some cases, the signal may include a synchronization signal within a DRS subframe of the frame, and the at least one repetition of the signal may include a repetition of the synchronization signal within the DRS subframe. In some examples, the signal may include an eMPDCCH within a temporally second subframe of the frame. Additionally or alternatively, the signal may include a plurality of CRSs within a temporally first subframe of the frame. In such cases, the at least one repetition of the signal includes a repetition of the CRSs over a plurality of subsequent subframes.

In some examples, the signal includes an eMPDCCH within a subframe of the frame, where the at least one repetition of the signal includes a frequency domain repetition of the eMPDCCH within a transmission opportunity as the subframe. In other examples, the signal includes a PDSCH within a first subframe of the frame, where the at least one repetition of the signal includes a repetition of the PDSCH within additional subframes of a transmission opportunity including the first subframe. Additionally or alternatively, the signal may include a PDSCH within a subframe of the frame, where the at least one repetition of the signal includes a time-domain repetition of the PDSCH within a TxOP including the subframe and a subsequent TxOP.

The LBT component 1430 may perform an LBT procedure for one or more channels in the unlicensed spectrum and determine that the one or more channels are clear based on the performed LBT procedure. For example, the LBT procedure may be an example of an extended CCA, which may include a multi-subframe CCA. The frame transmission component 1435 may transmit the frame based on the determination.

The transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
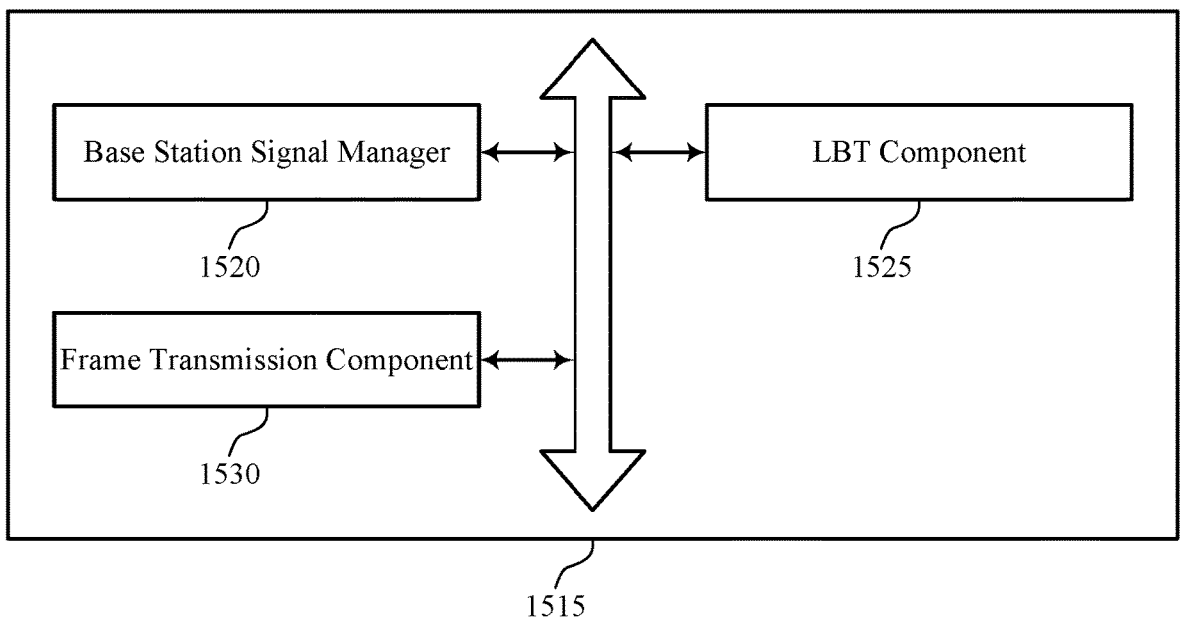

FIG. 15 shows a block diagram 1500 of a base station unlicensed spectrum manager 1515 that supports unlicensed spectrum coverage enhancement for industrial IoT. The base station unlicensed spectrum manager 1515 may be an example of aspects of a base station unlicensed spectrum manager 1615 described with reference to FIGS. 13, 14, and 16. The base station unlicensed spectrum manager 1515 may include a base station signal manager 1520, an LBT component 1525, and a frame transmission component 1530. Each of these modules may communicate, directly or indirectly, with one another (such as via one or more buses).

The base station signal manager 1520 may generate a frame including a signal and at least one repetition of the signal in time or in frequency, the signal including a data signal or a control signal. In some cases, the signal may include a synchronization signal within a DRS subframe of the frame, and the at least one repetition of the signal may include a repetition of the synchronization signal within the DRS subframe. In some examples, the signal may include an eMPDCCH within a temporally second subframe of the frame. Additionally or alternatively, the signal may include a plurality of CRSs within a temporally first subframe of the frame. In such cases, the at least one repetition of the signal includes a repetition of the CRSs over a plurality of subsequent subframes.

In some examples, the signal includes an eMPDCCH within a subframe of the frame, where the at least one repetition of the signal includes a frequency domain repetition of the eMPDCCH within a transmission opportunity as the subframe. In other examples, the signal includes a PDSCH within a first subframe of the frame, where the at least one repetition of the signal includes a repetition of the PDSCH within additional subframes of a transmission opportunity including the first subframe. Additionally or alternatively, the signal may include a PDSCH within a subframe of the frame, where the at least one repetition of the signal includes a time-domain repetition of the PDSCH within a TxOP including the subframe and a subsequent TxOP.

The LBT component 1525 may perform an LBT procedure for one or more channels in the unlicensed spectrum and determine that the one or more channels are clear based on the performed LBT procedure. Frame transmission component 1530 may transmit the frame based on the determination.

Figure 16:
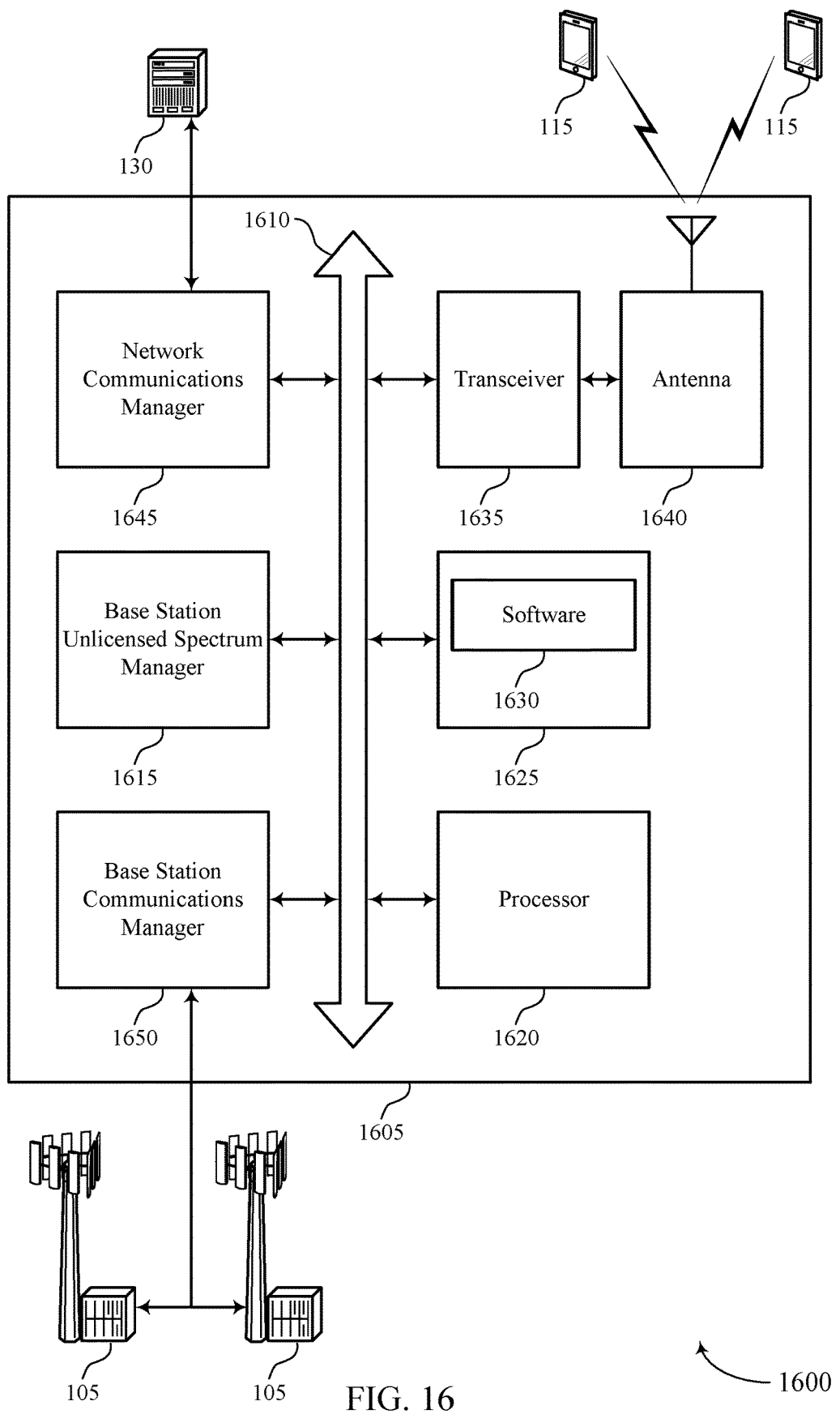
FIG. 16 illustrates a block diagram of a system including a base station that supports unlicensed spectrum coverage enhancement for industrial IoT.

FIG. 16 shows a diagram of a system 1600 including a device 1605 that supports unlicensed spectrum coverage enhancement for industrial IoT. The device 1605 may be an example of or include the components of base station 105 as described above, such as with reference to FIG. 1. The device 1605 may include components for bi-directional voice and data communications including components for transmitting and receiving communications, including a base station unlicensed spectrum manager 1615, a processor 1620, memory 1625, software 1630, a transceiver 1635, an antenna 1640, a network communications manager 1645, and a base station communications manager 1650. These components may be in electronic communication via one or more busses (such as a bus 1610). The device 1605 may communicate wirelessly with one or more UEs 115.

The processor 1620 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some cases, the processor 1620 may be configured to operate a memory array using a memory controller. In some other cases, a memory controller may be integrated into processor 1620. The processor 1620 may be configured to execute computer-readable instructions stored in a memory to perform various functions (such as functions or tasks supporting unlicensed spectrum coverage enhancement for industrial IoT).

The memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

The software 1630 may include code to implement aspects of the present disclosure, including code to support unlicensed spectrum coverage enhancement for industrial IoT. The software 1630 may be stored in a non-transitory computer-readable medium such as system memory or other memory. In some cases, the software 1630 may not be directly executable by the processor but may cause a computer (such as when compiled and executed) to perform functions described herein.

The transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 also may include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions. The network communications manager 1645 may manage communications with the core network (such as via one or more wired backhaul links). For example, the network communications manager 1645 may manage the transfer of data communications for client devices, such as one or more UEs 115.

The base station communications manager 1650 may manage communications with other base stations 105, and may include a controller or scheduler for controlling communications with UEs 115 in cooperation with other base stations 105. For example, the base station communications manager 1650 may coordinate scheduling for transmissions to UEs 115 for various interference mitigation techniques such as beamforming or joint transmission. In some examples, the base station communications manager 1650 may provide an X2 interface within an LTE/LTE-A wireless communication network technology to provide communication between base stations 105.

Figure 17:
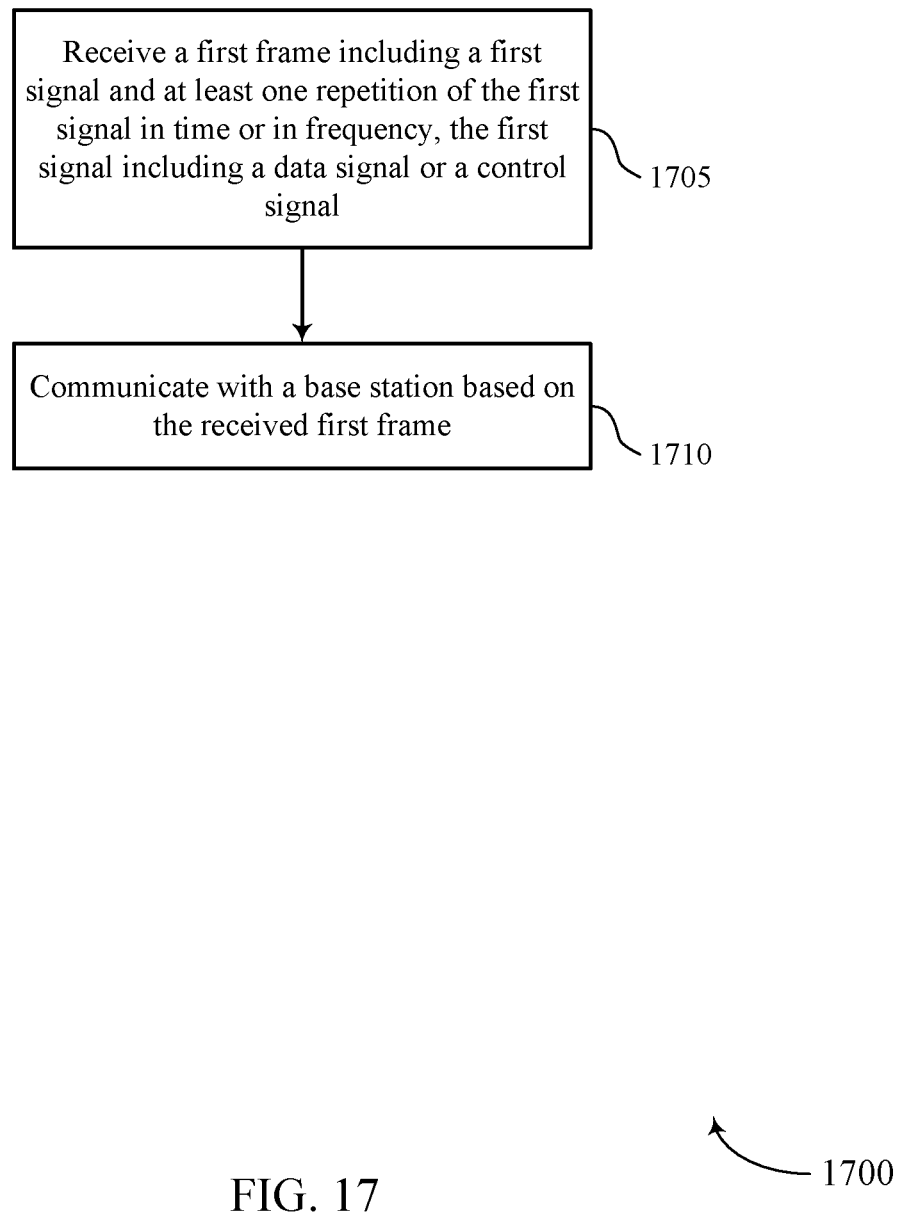
FIGS. 17 through 20 illustrate methods for unlicensed spectrum coverage enhancement for industrial IoT.

FIG. 17 shows a flowchart illustrating a method 1700 for unlicensed spectrum coverage enhancement for industrial IoT. The operations of the method 1700 may be implemented by a UE 115 or its components as described herein. For example, the operations of the method 1700 may be performed by a UE unlicensed spectrum manager as described with reference to FIGS. 9 through 12. In some implementations, a UE 115 may execute a set of codes to control the functional elements of the device to perform the functions described below. Additionally or alternatively, the UE 115 may perform aspects the functions described below using special-purpose hardware.

At block 1705 the UE 115 may receive a first frame including a first signal and at least one repetition of the first signal in time or in frequency, the first signal including a data signal or a control signal. The operations of the block 1705 may be performed according to the methods described with reference to FIGS. 1 through 8. In some implementations, aspects of the operations of the block 1705 may be performed by a signal manager as described with reference to FIGS. 9 through 12, which may operate in cooperation with a receiver 910 or 1010 as described with reference to FIG. 9 or 10, or antenna(s) 1240 and transceiver 1235 as described with reference to FIG. 12.

At block 1710 the UE 115 may communicate with a base station based at least in part on the received first frame. The operations of the block 1710 may be performed according to the methods described with reference to FIGS. 1 through 8. In some implementations, aspects of the operations of the block 1710 may be performed by a communications manager as described with reference to FIGS. 9 through 12, which may operate in cooperation with antenna(s) 1240 and transceiver 1235 as described with reference to FIG. 12.

Figure 18:
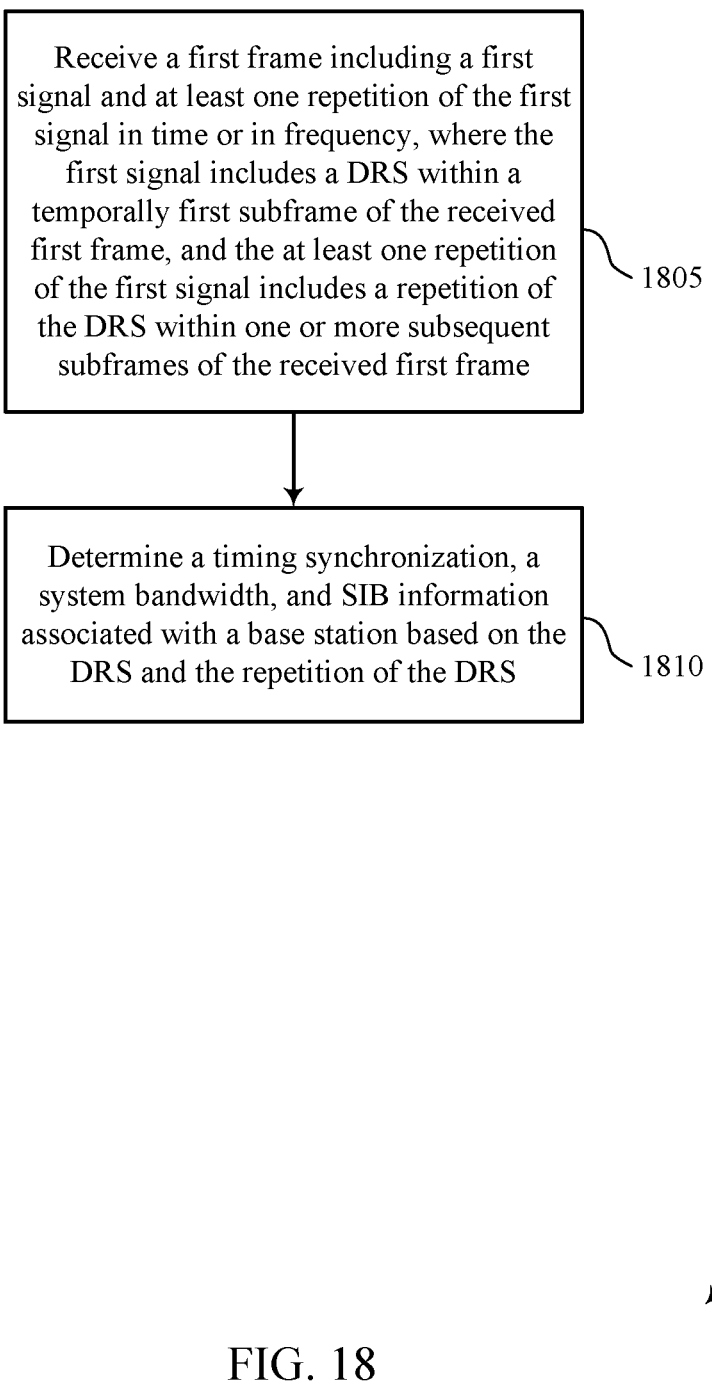

FIG. 18 shows a flowchart illustrating a method 1800 for unlicensed spectrum coverage enhancement for industrial. The operations of the method 1800 may be implemented by a UE 115 or its components as described herein. For example, the operations of the method 1800 may be performed by a UE unlicensed spectrum manager as described with reference to FIGS. 9 through 12. In some implementations, a UE 115 may execute a set of codes to control the functional elements of the device to perform the functions described below. Additionally or alternatively, the UE 115 may perform aspects the functions described below using special-purpose hardware.

At block 1805 the UE 115 may receive a first frame including a first signal and at least one repetition of the first signal in time or in frequency, where the first signal includes a DRS within a temporally first subframe of the received first frame, and where the at least one repetition of the first signal includes a repetition of the DRS within one or more subsequent subframes of the received first frame. The operations of the block 1805 may be performed according to the methods described with reference to FIGS. 1 through 8. In some implementations, aspects of the operations of the block 1805 may be performed by a signal manager as described with reference to FIGS. 9 through 12, which may operate in cooperation with a receiver 910 or 1010 as described with reference to FIG. 9 or 10, or antenna(s) 1240 and transceiver 1235 as described with reference to FIG. 12.

At block 1810 the UE 115 may determine a timing synchronization, a system bandwidth, and SIB information associated with a base station based on the DRS and the repetition of the DRS. The operations of the block 1810 may be performed according to the methods described with reference to FIGS. 1 through 8. In some implementations, aspects of the operations of the block 1810 may be performed by a communications manager as described with reference to FIGS. 9 through 12.

Figure 19:
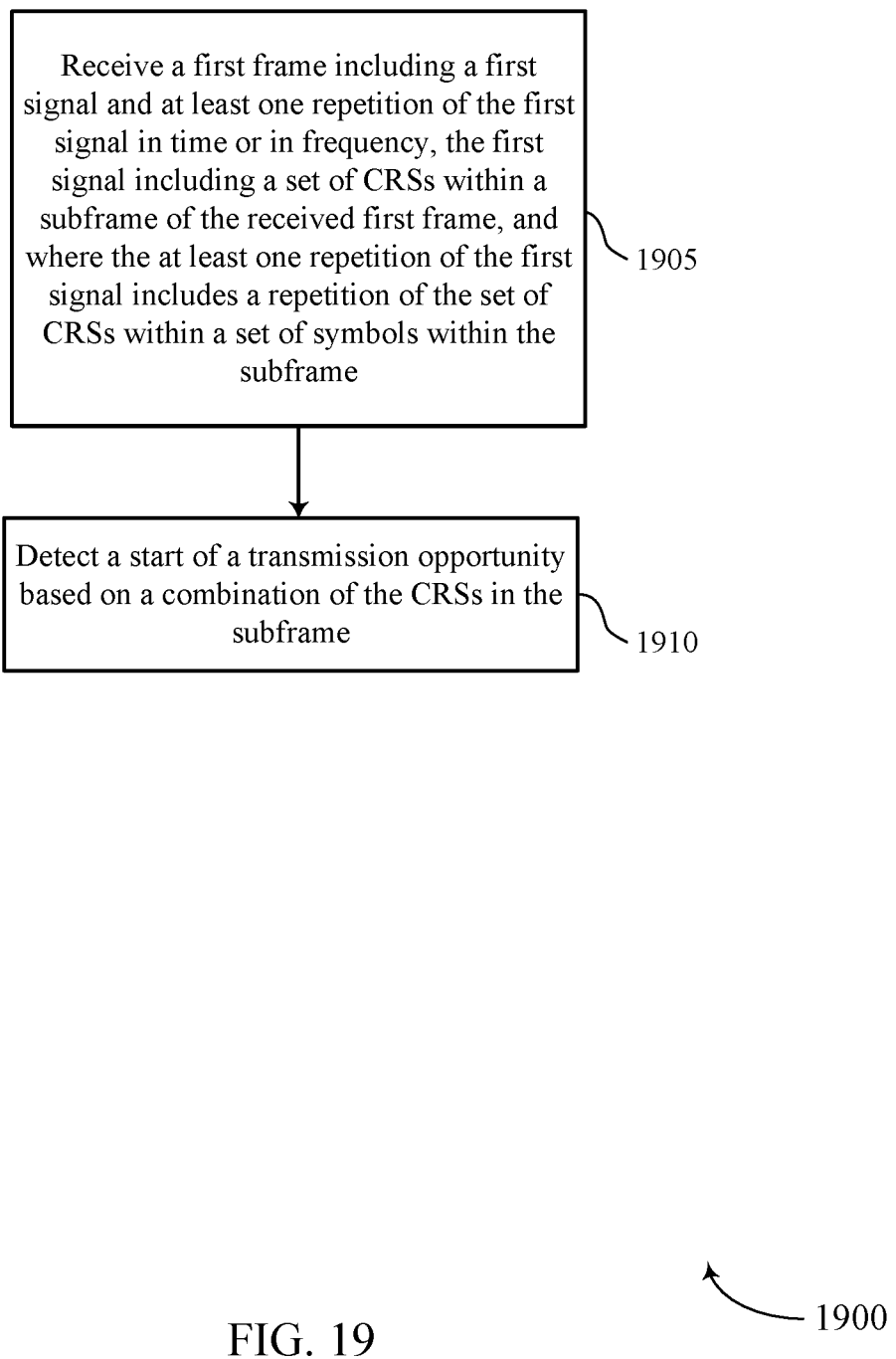

FIG. 19 shows a flowchart illustrating a method 1900 for unlicensed spectrum coverage enhancement for industrial IoT. The operations of the method 1900 may be implemented by a UE 115 or its components as described herein. For example, the operations of the method 1900 may be performed by a UE unlicensed spectrum manager as described with reference to FIGS. 9 through 12. In some implementations, a UE 115 may execute a set of codes to control the functional elements of the device to perform the functions described below. Additionally or alternatively, the UE 115 may perform aspects the functions described below using special-purpose hardware.

At block 1905 the UE 115 may receive a first frame including a first signal and at least one repetition of the first signal in time or in frequency, the first signal including a set of CRSs within a subframe of the received first frame, and where the at least one repetition of the first signal includes a repetition of the set of CRSs within a set of symbols within the subframe. The operations of the block 1905 may be performed according to the methods described with reference to FIGS. 1 through 8. In some implementations, aspects of the operations of the block 1905 may be performed by a signal manager as described with reference to FIGS. 9 through 12, which may operate in cooperation with a receiver 910 or 1010 as described with reference to FIG. 9 or 10, or antenna(s) 1240 and transceiver 1235 as described with reference to FIG. 12.

At block 1910 the UE 115 may detect a start of a TxOP based at least in part on a combination of the CRSs in the subframe. The operations of the block 1910 may be performed according to the methods described with reference to FIGS. 1 through 8. In some implementations, aspects of the operations of the block 1910 may be performed by a transmission detector as described with reference to FIGS. 9 through 12.

Figure 20:
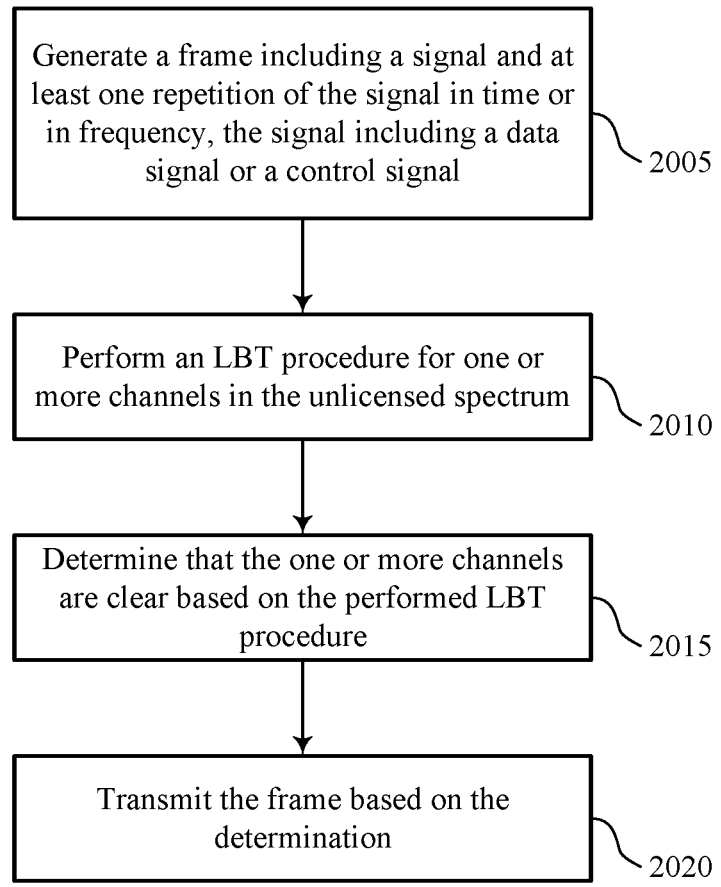

FIG. 20 shows a flowchart illustrating a method 2000 for unlicensed spectrum coverage enhancement for industrial IoT. The operations of the method 2000 may be implemented by a base station 105 or its components as described herein. For example, the operations of the method 2000 may be performed by a base station unlicensed spectrum manager as described with reference to FIGS. 13 through 16. In some implementations, a base station 105 may execute a set of codes to control the functional elements of the device to perform the functions described below. Additionally or alternatively, the base station 105 may perform aspects the functions described below using special-purpose hardware.

At block 2005 the base station 105 may generate a frame including a signal and at least one repetition of the signal in time or in frequency, the signal including a data signal or a control signal. The operations of the block 2005 may be performed according to the methods described with reference to FIGS. 1 through 8. In some implementations, aspects of the operations of the block 2005 may be performed by a base station signal manager as described with reference to FIGS. 13 through 16.

At block 2010 the base station 105 may perform an LBT procedure for one or more channels in the unlicensed spectrum. The operations of the block 2010 may be performed according to the methods described with reference to FIGS. 1 through 8. In some implementations, aspects of the operations of the block 2010 may be performed by a LBT component as described with reference to FIGS. 13 through 16.

At block 2015 the base station 105 may determine that the one or more channels are clear based at least in part on the performed LBT procedure. The operations of the block 2015 may be performed according to the methods described with reference to FIGS. 1 through 8. In some implementations, aspects of the operations of the block 2015 may be performed by a LBT component as described with reference to FIGS. 13 through 16.

At block 2020 the base station 105 may transmit the frame based at least in part on the determination. The operations of the block 2020 may be performed according to the methods described with reference to FIGS. 1 through 8. In some implementations, aspects of the operations of the block 2020 may be performed by a frame transmission component as described with reference to FIGS. 13 through 16, which may operate in cooperation with a transmitter 1320 or 1420 as described with reference to FIG. 13 or 14, or antenna(s) 1640 and transceiver 1635 as described with reference to FIG. 16.

It should be noted that the methods described above describe possible implementations, and that the operations and the steps may be rearranged or otherwise modified and that other implementations are possible. Furthermore, aspects from two or more of the methods may be combined.

As used herein, a phrase referring to "at least one of" a list of items refers to any combination of those items, including single members. As an example, "at least one of: a, b, or c" is intended to cover: a, b, c, a-b, a-c, b-c, and a-b-c. Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication at a device using unlicensed spectrum, comprising:
   receiving a first frame including a first signal and at least one repetition of the first signal in time or in frequency, the first signal including a data signal or a control signal, wherein the first signal includes a discovery reference signal (DRS) within a temporally first subframe of the received first frame and an enhanced machine type communication (MTC) physical downlink control channel (eMPDCCH) within a temporally second subframe of the received first frame, and wherein the at least one repetition of the first signal includes a repetition of the DRS within one or more subsequent subframes of the received first frame;
   receiving a configuration of the first frame via a common control channel, the configuration comprising a ratio of uplink subframes to downlink subframes, wherein the at least one repetition is based at least in part on the configuration; and
   communicating with a base station based at least in part on the received first frame.

2. The method of claim 1, further comprising:
   determining a timing synchronization, a system bandwidth, and system information block (SIB) information associated with the base station based at least in part on the DRS and the repetition of the DRS.

3. The method of claim 2, wherein the first signal includes a synchronization signal within a DRS subframe of the received first frame, and wherein the at least one repetition of the first signal includes a repetition of the synchronization signal within the DRS subframe.

4. The method of claim 2, further comprising:
   identifying a plurality of system information blocks (SIBs) within a subsequent subframe of the received first frame based at least in part on the eMPDCCH.

5. The method of claim 1, further comprising:
   receiving a second frame including a second signal and at least one repetition of the second signal in time or in frequency, wherein the second signal includes a plurality of cell-specific reference signals (CRSs) within a temporally first subframe of the received second frame, and wherein the at least one repetition of the second signal includes a repetition of the plurality of CRSs over a plurality of subsequent subframes, the method further comprising:
   detecting a start of a transmission opportunity based at least on a combination of the plurality of CRSs in the temporally first subframe.

6. The method of claim 1, wherein the at least one repetition of the first signal includes a frequency domain repetition of the eMPDCCH within a same transmission opportunity as the temporally second subframe, the method further comprising:
   identifying a starting point of the eMPDCCH based at least in part on the temporally second subframe; and
   decoding the second frame based at least in part on the starting point of the eMPDCCH and an accumulation of the eMPDCCH within the same transmission opportunity of the temporally second subframe.

7. The method of claim 1, further comprising:
   receiving a second frame including a second signal and at least one repetition of the second signal in time or in frequency, wherein the second signal includes a physical downlink control channel (PDCCH) within a subframe of the received second frame, and wherein the at least one repetition of the second signal includes a repetition of the PDCCH within a same transmission opportunity as the subframe, the method further comprising:
   identifying a starting point of the PDCCH based at least in part on the subframe; and
   decoding the second frame based at least in part on the identified starting point of the PDCCH and an accumulation of the PDCCH within the same transmission opportunity as the subframe.

8. The method of claim 1, further comprising:
   receiving a second frame including a second signal and at least one repetition of the second signal in time or in frequency, wherein the second signal includes a physical downlink control channel (PDCCH) within a temporally first subframe of the received second frame, and wherein the temporally first subframe is within a first transmission opportunity, and the at least one repetition of the second signal includes a repetition of the PDCCH within a subsequent transmission opportunity, the method further comprising:
   identifying a starting point of the PDCCH based at least in part on the temporally first subframe; and
   decoding the second frame based at least in part on the starting point of the PDCCH and an accumulation of the PDCCH within the first transmission opportunity and the subsequent transmission opportunity.

9. The method of claim 1, further comprising:
   receiving a second frame including a second signal and at least one repetition of the second signal in time or in frequency, wherein the second signal includes a physical downlink shared channel (PDSCH) within a first subframe of the received second frame, and wherein the at least one repetition of the second signal includes a repetition of the PDSCH within additional subframes of a transmission opportunity including the first subframe, the method further comprising:
decoding the PDSCH based at least in part on the PDSCH within the first subframe and the repetition of the PDSCH within the additional subframes.

10. The method of claim 1, further comprising:
receiving a second frame including a second signal and at least one repetition of the second signal in time or in frequency, wherein the second signal includes a physical downlink shared channel (PDSCH) within a subframe of the received second frame, and wherein the at least one repetition of the second signal includes a time-domain repetition of the PDSCH within a transmission opportunity including the subframe and a subsequent transmission opportunity.

11. The method of claim 1, further comprising:
transmitting a second frame including a second signal and at least one repetition of the second signal, the second signal including a physical random access channel (PRACH), and wherein the second signal and the at least one repetition of the second signal are located within contiguous subframes.

12. A method for wireless communication at a device using unlicensed spectrum, comprising:
generating a frame including a signal and at least one repetition of the signal in time or in frequency, the signal including a data signal or a control signal, wherein the signal includes a discovery reference signal (DRS) within a temporally first subframe of the frame and an enhanced machine type communication (MTC) physical downlink control channel (eMPDCCH) within a temporally second subframe of the frame, and wherein the at least one repetition of the signal includes a repetition of the DRS within one or more subsequent subframes of the frame;
performing a listen before talk (LBT) procedure for one or more channels in the unlicensed spectrum;
determining that the one or more channels are clear based at least in part on the performed LBT procedure;
transmitting the frame based at least in part on the determination; and
transmitting, via a common control channel, a configuration of the frame, the configuration comprising a ratio of uplink subframes to downlink subframes within the frame, wherein the at least one repetition is based at least in part on the configuration.

13. The method of claim 12, wherein the signal includes a synchronization signal within a DRS subframe of the frame, and wherein the at least one repetition of the signal includes a repetition of the synchronization signal within the DRS subframe.

14. The method of claim 12, further comprising:
generating a second frame including a second signal and at least one repetition of the second signal in time or in frequency, wherein the second signal includes a plurality of cell-specific reference signals (CRSs) within a temporally first subframe of the second frame, and wherein the at least one repetition of the second signal includes a repetition of the plurality of CRSs over a plurality of subsequent subframes.

15. The method of claim 12, further comprising:
generating a second frame including a second signal and at least one repetition of the second signal in time or in frequency, wherein the at least one repetition of the second signal includes a frequency domain repetition of the eMPDCCH within a same transmission opportunity as the temporally second subframe.

16. The method of claim 12, further comprising:
generating a second frame including a second signal and at least one repetition of the second signal in time or in frequency, wherein the second signal includes a physical downlink shared channel (PDSCH) within a first subframe of the second frame, and wherein the at least one repetition of the second signal includes a repetition of the PDSCH within additional subframes of a transmission opportunity including the first subframe.

17. The method of claim 12, further comprising:
generating a second frame including a second signal and at least one repetition of the second signal in time or in frequency, wherein the second signal includes a physical downlink shared channel (PDSCH) within a subframe of the second frame, and wherein the at least one repetition of the second signal includes a time-domain repetition of the PDSCH within a transmission opportunity including the subframe and a subsequent transmission opportunity.

18. An apparatus for wireless communication at a device using unlicensed spectrum, in a system comprising:
a processor;
memory in electronic communication with the processor; and
instructions stored in the memory and operable, when executed by the processor, to cause the apparatus to:
receive a first frame including a first signal and at least one repetition of the first signal in time or in frequency, the first signal including a data signal or a control signal, wherein the first signal includes a discovery reference signal (DRS) within a temporally first subframe of the received first frame and an enhanced machine type communication (MTC) physical downlink control channel (eMPDCCH) within a temporally second subframe of the received first frame, and wherein the at least one repetition of the first signal includes a repetition of the DRS within one or more subsequent subframes of the received first frame;
receive a configuration of the first frame via a common control channel, the configuration comprising a ratio of uplink subframes to downlink subframes, wherein the at least one repetition is based at least in part on the configuration; and
communicate with a base station based at least in part on the received first frame.

19. The apparatus of claim 18, wherein the instructions are further executable to:
determine a timing synchronization, a system bandwidth, and system information block (SIB) information associated with the base station based at least in part on the DRS and the repetition of the DRS.

20. The apparatus of claim 19, wherein the first signal includes a synchronization signal within a DRS subframe of the received first frame, and wherein the at least one repetition of the first signal includes a repetition of the synchronization signal within the DRS subframe.

21. The apparatus of claim 19, wherein the instructions are further executable to:
  identify a plurality of SIBs within a subsequent subframe of the received first frame based at least in part on the eMPDCCH.

22. The apparatus of claim 18, wherein the at least one repetition of the first signal includes a frequency domain repetition of the eMPDCCH within a same transmission opportunity as the temporally second subframe, the instructions further executable to:
  identify a starting point of the eMPDCCH based at least in part on the subframe; and
  decode the first frame based at least in part on the starting point of the eMPDCCH and an accumulation of the eMPDCCH within the same transmission opportunity of the temporally second subframe.

23. The apparatus of claim 18, wherein the instructions are further executable to:
  receive a second frame including a second signal and at least one repetition of the second signal in time or in frequency, wherein the second signal includes a physical downlink shared channel (PDSCH) within a subframe of the received second frame, and wherein the at least one repetition of the second signal includes a time-domain repetition of the PDSCH within a transmission opportunity including the subframe and a subsequent transmission opportunity.

24. An apparatus for wireless communication at a device using unlicensed spectrum, in a system comprising:
  a processor;
  memory in electronic communication with the processor; and
  instructions stored in the memory and operable, when executed by the processor, to cause the apparatus to:
    generate a frame including a signal and at least one repetition of the signal in time or in frequency, the signal including a data signal or a control signal, wherein the signal includes a discovery reference signal (DRS) within a temporally first subframe of the frame and an enhanced machine type communication (MTC) physical downlink control channel (eMPDCCH) within a temporally second subframe of the frame, and wherein the at least one repetition of the signal includes a repetition of the DRS within one or more subsequent subframes of the frame;
    perform a listen before talk (LBT) procedure for one or more channels in the unlicensed spectrum;
    determine that the one or more channels are clear based at least in part on the performed LBT procedure;
    transmit the frame based at least in part on the determination; and
    transmit, via a common control channel, a configuration of the frame, the configuration comprising a ratio of uplink subframes to downlink subframes within the frame, wherein the at least one repetition is based at least in part on the configuration.

25. The apparatus of claim 24, wherein the at least one repetition of the signal includes a frequency domain repetition of the eMPDCCH within a transmission opportunity as the subframe.

26. The apparatus of claim 24, wherein the instructions are further executable to:
  generate a second frame including a second signal and at least one repetition of the second signal in time or in frequency, wherein the second signal includes a physical downlink shared channel (PDSCH) within a subframe of the second frame, and wherein the at least one repetition of the second signal includes a time-domain repetition of the PDSCH within a transmission opportunity including the subframe and a subsequent transmission opportunity.

* * * * *